US012612953B2

(12) United States Patent
Henderickx et al.

(10) Patent No.: US 12,612,953 B2
(45) Date of Patent: Apr. 28, 2026

(54) HYDRAULIC PORT PROTECTION PLUGS FOR SHOCK ABSORBERS

(71) Applicant: Advanced Suspension Technology LLC, Northville, MI (US)

(72) Inventors: Jonas Henderickx, Hasselt (BE); Kenny Berwaerts, Muizen (BE); Frederik Baldoni, Borgloon (BE); Stein Slootmaekers, Wellen (BE); Peter Maex, Antwerp (BE); Tom Vandersmissen, Limburg (BE)

(73) Assignee: Advanced Suspension Technology LLC, Northville, MI (US)

( * ) Notice: Subject to any disclaimer, the term of this patent is extended or adjusted under 35 U.S.C. 154(b) by 398 days.

(21) Appl. No.: 18/536,944

(22) Filed: Dec. 12, 2023

(65) Prior Publication Data

US 2024/0191769 A1     Jun. 13, 2024

Related U.S. Application Data

(63) Continuation-in-part of application No. 18/080,180, filed on Dec. 13, 2022, now Pat. No. 12,502,921.

(51) Int. Cl.
B60G 13/00          (2006.01)
B60G 13/08          (2006.01)
(Continued)

(52) U.S. Cl.
CPC .............. *F16F 9/369* (2013.01); *B60G 13/08* (2013.01); *B60G 21/06* (2013.01); *F16F 9/19* (2013.01);
(Continued)

(58) Field of Classification Search
CPC ...... B60G 13/08; B60G 21/06; B60G 15/066; B60G 2202/24; B60G 2206/41;
(Continued)

(56) References Cited

U.S. PATENT DOCUMENTS 3,504,699 A     4/1970  Grise
5,458,219 A    10/1995  Anderson
(Continued)

FOREIGN PATENT DOCUMENTS

CN          202402627 U     8/2012
CN          216618089 U     5/2022
(Continued)

OTHER PUBLICATIONS

International Search Report and Written Opinion of the ISA issued in PCT/US2023/083607, mailed Apr. 18, 2024; ISA/US.

*Primary Examiner* — Christopher P Schwartz
(74) *Attorney, Agent, or Firm* — Harness, Dickey & Pierce, P.L.C.

(57) ABSTRACT

Hydraulic port protection plugs for insertion into hydraulic ports in a shock absorber to prevent contaminants from entering the shock absorber and residual oil from draining out through the hydraulic ports during storage, shipping, and handling of the shock absorber. The hydraulic port protection plugs comprise a tubular body and a pierceable seal that is configured to receive an inboard portion of a hydraulic fitting. The pierceable seal is designed so that the inboard portion of the hydraulic fitting may be inserted through the pierceable seal of the hydraulic port protection plug and into the hydraulic port in the shock absorber such that the hydraulic port protection plug does not have to be removed and seals the hydraulic fitting within the hydraulic port in the shock absorber in an installed position.

20 Claims, 18 Drawing Sheets

(51) Int. Cl.

| | |
|---|---|
| *B60G 21/06* | (2006.01) |
| *F16F 9/19* | (2006.01) |
| *F16F 9/32* | (2006.01) |
| *F16F 9/36* | (2006.01) |
| *F16F 9/43* | (2006.01) |

(52) U.S. Cl.

CPC .............. *F16F 9/3271* (2013.01); *F16F 9/43* (2013.01); *B60G 2202/24* (2013.01); *B60G 2204/12* (2013.01); *B60G 2204/80* (2013.01); *B60G 2206/41* (2013.01); *B60G 2206/80* (2013.01); *B60G 2800/162* (2013.01); *F16F 2226/04* (2013.01); *F16F 2230/0023* (2013.01); *F16F 2230/06* (2013.01); *F16F 2230/30* (2013.01)

(58) Field of Classification Search

CPC .......... B60G 2204/129; B60G 2204/80; B60G 2800/162; B60G 2204/12; B60G 2206/80; B60G 2203/314; B60G 2204/4304; B60G 2204/201; B60G 2206/90; F16J 15/024; F16J 13/14; F16J 15/106; F16F 9/4316; F16F 9/19; F16F 9/3271; F16F 2230/30; F16F 2230/06; F16F 2226/04; F16F 2230/0023

USPC ......... 188/313, 322.21; 137/511, 512.4, 514, 137/846, 877, 878

See application file for complete search history.

(56) References Cited

U.S. PATENT DOCUMENTS

| | | | |
|---|---|---|---|
| 5,582,966 | A | 12/1996 | Nakamura et al. |
| 5,682,966 | A | 11/1997 | Cabrerizo-Pariente |
| 6,044,752 | A | 4/2000 | Harigaya |
| 7,168,535 | B2 | 1/2007 | Harbu |
| 7,445,028 | B1 | 11/2008 | Aanonsen et al. |
| 8,579,870 | B2 | 11/2013 | Willis et al. |
| 9,120,410 | B2 | 9/2015 | Bauman |
| 10,335,561 | B2 | 7/2019 | Krüger |
| 10,859,540 | B2 | 12/2020 | Carlisle et al. |
| 12,502,921 | B2 * | 12/2025 | Baldoni ................ B60G 13/08 |
| 2004/0089507 | A1 | 5/2004 | Harbu |
| 2024/0191769 | A1 | 6/2024 | Henderickx et al. |

FOREIGN PATENT DOCUMENTS

| | | | |
|---|---|---|---|
| FR | 2136944 | A1 | 12/1972 |
| JP | 2005133902 | A | 5/2005 |
| JP | 2007205416 | A | 8/2007 |
| KR | 20090087180 | A | 8/2009 |
| WO | WO-2020252243 | A1 | 12/2020 |

* cited by examiner

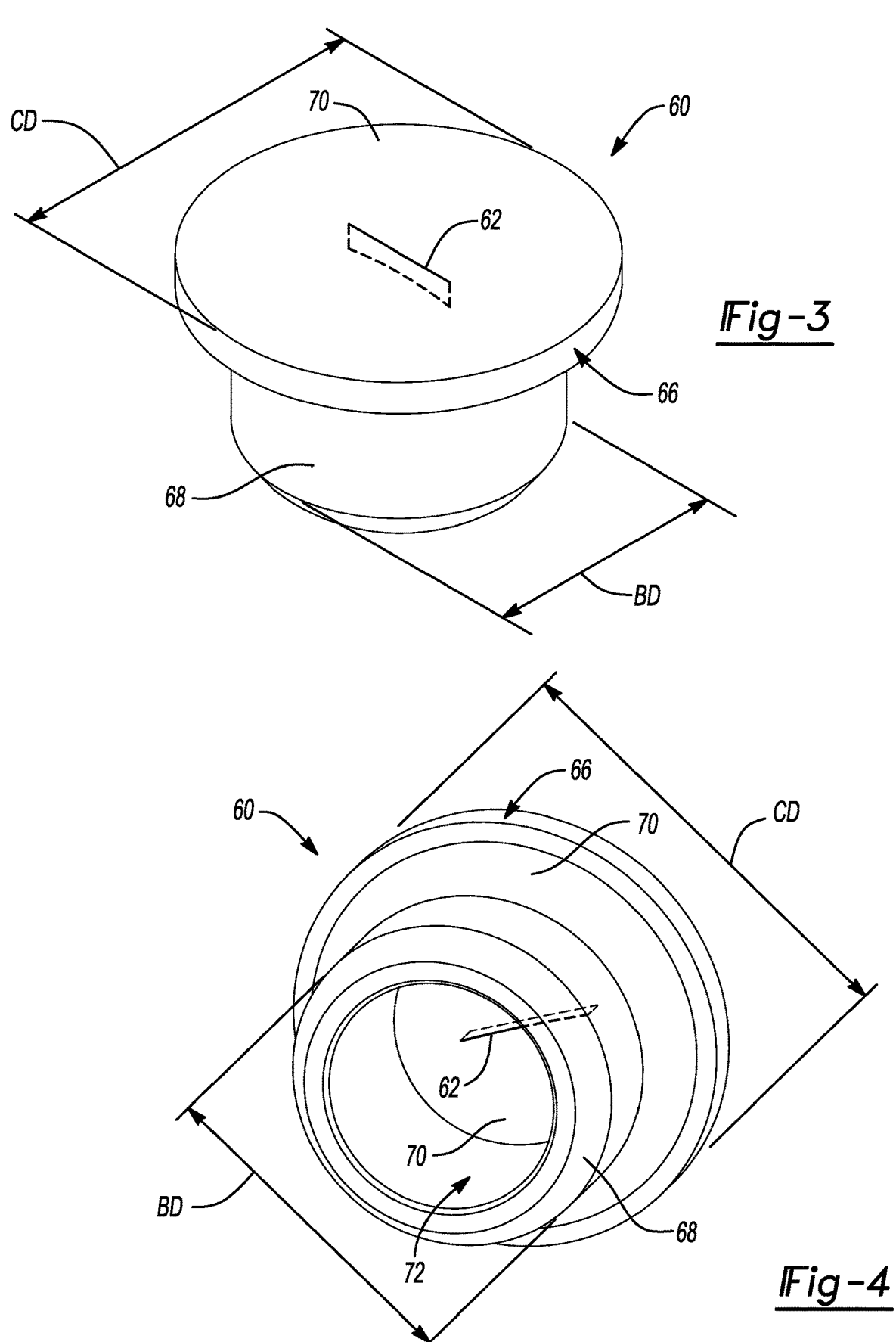
_Fig-3_
_Fig-4_

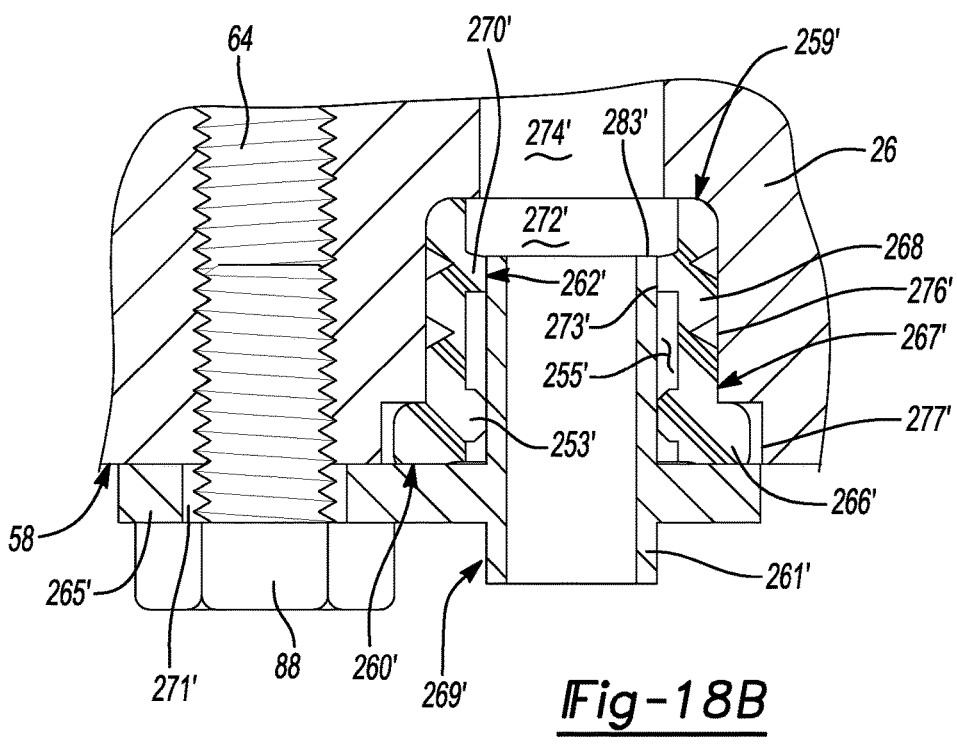
_Fig-18B_
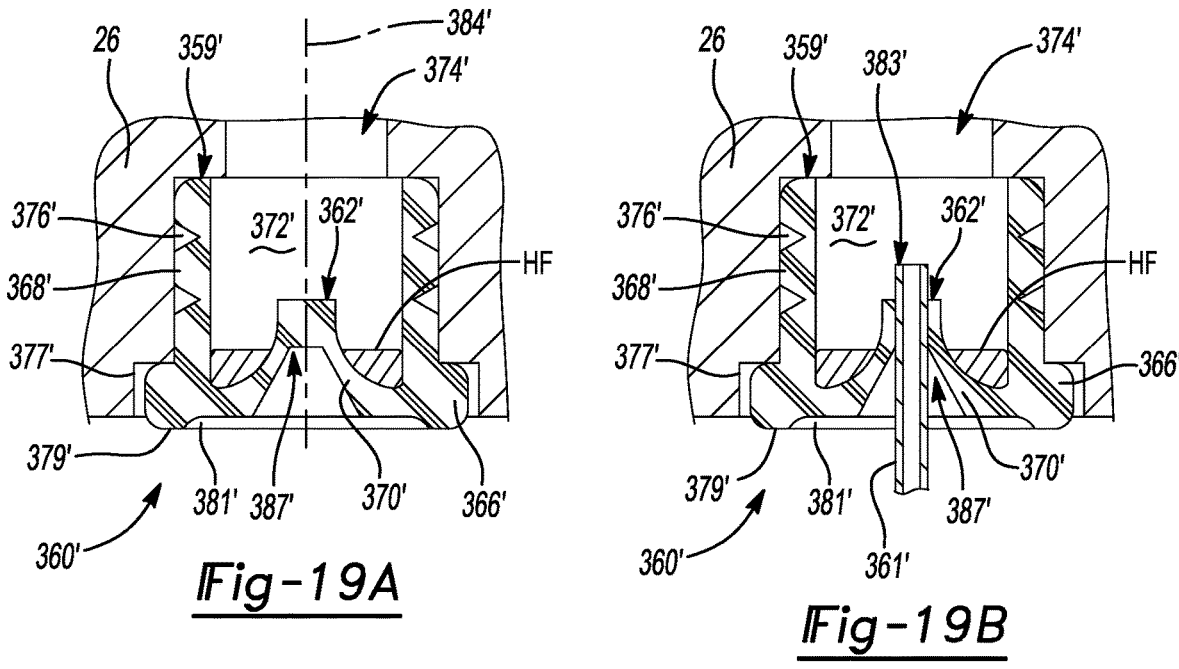
_Fig-19A_                    _Fig-19B_

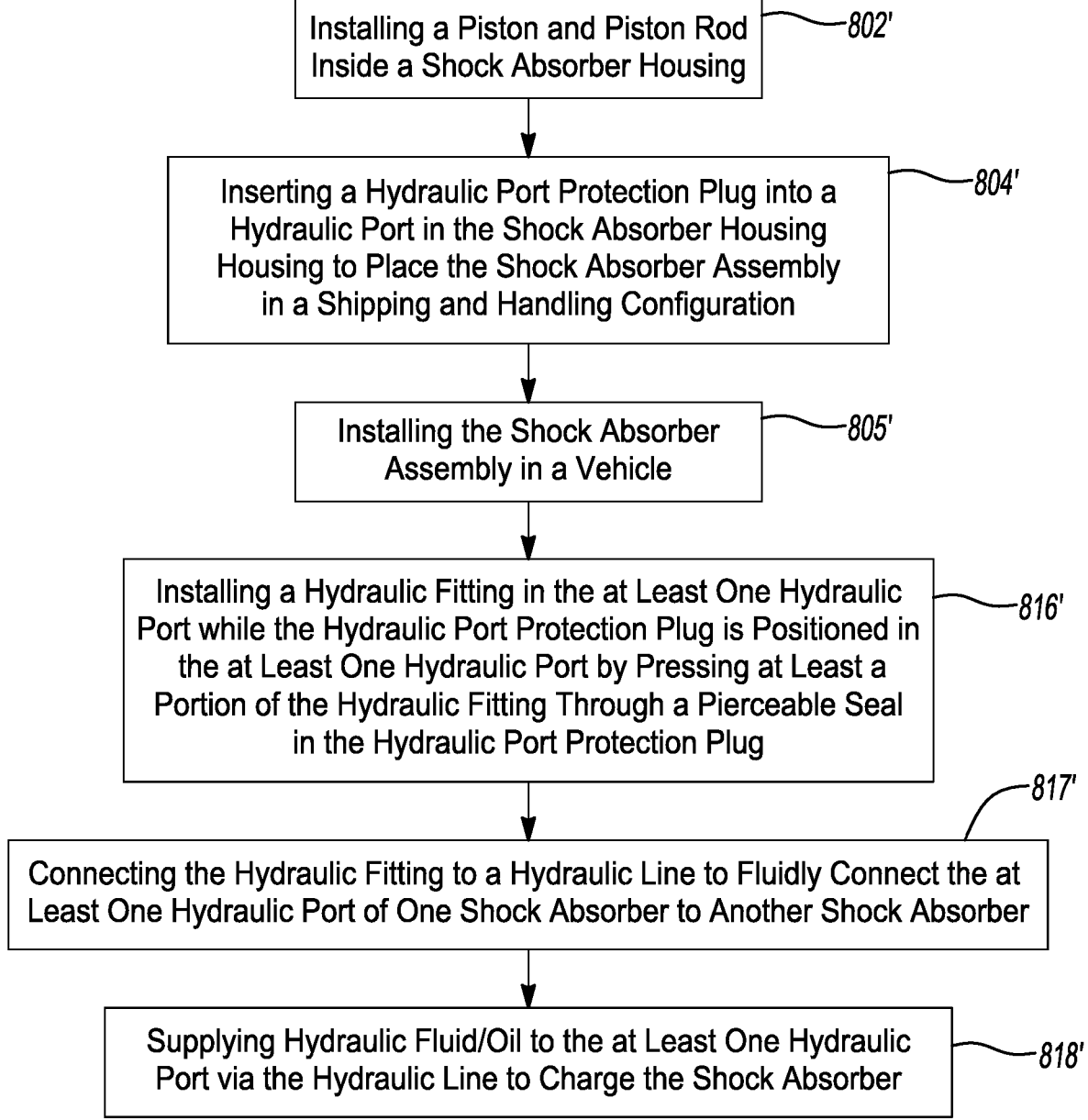

Installing a Piston and Piston Rod Inside a Shock Absorber Housing —802'

Inserting a Hydraulic Port Protection Plug into a Hydraulic Port in the Shock Absorber Housing Housing to Place the Shock Absorber Assembly in a Shipping and Handling Configuration —804'

Installing the Shock Absorber Assembly in a Vehicle —805'

Installing a Hydraulic Fitting in the at Least One Hydraulic Port while the Hydraulic Port Protection Plug is Positioned in the at Least One Hydraulic Port by Pressing at Least a Portion of the Hydraulic Fitting Through a Pierceable Seal in the Hydraulic Port Protection Plug —816'

Connecting the Hydraulic Fitting to a Hydraulic Line to Fluidly Connect the at Least One Hydraulic Port of One Shock Absorber to Another Shock Absorber —817'

Supplying Hydraulic Fluid/Oil to the at Least One Hydraulic Port via the Hydraulic Line to Charge the Shock Absorber —818'

*Fig-22*

HYDRAULIC PORT PROTECTION PLUGS FOR SHOCK ABSORBERS

CROSS-REFERENCE TO RELATED APPLICATIONS

This is a continuation-in-part of U.S. patent application Ser. No. 18/080,180, which was filed on Dec. 13, 2022. The entire disclosure of the above application is incorporated herein by reference.

FIELD

The present disclosure relates generally to shock absorbers for use in a suspension system such as a suspension system used for motor vehicles. More particularly, the present disclosure relates to protection plugs that are installed in the hydraulic ports of shock absorbers to prevent contamination during shipping, handling, and storage before the shock absorber is installed on a vehicle.

BACKGROUND

The statements in this section merely provide background information related to the present disclosure and may not constitute prior art.

Shock absorbers are used in conjunction with vehicle suspension systems to absorb unwanted vibrations and impacts which occur during movement of the vehicle. In order to absorb these unwanted vibrations and impacts, shock absorbers are generally connected between the sprung (body) and the unsprung (suspension/chassis) masses of the vehicle.

The most common type of shock absorbers for automobiles is the dashpot type. A piston is located within a pressure tube and is typically connected to the sprung mass of the vehicle through a piston rod. The pressure tube is typically connected to the unsprung mass of the vehicle. The piston divides the pressure tube into an upper working chamber and a lower working chamber. Valving limits the flow of damping fluid from the lower working chamber to the upper working chamber during compression and rebound strokes. Because the compression and rebound valving has the ability to limit the flow of damping fluid, the shock absorber is able to produce a damping force which counteracts the vibrations which would otherwise be transmitted from the unsprung mass to the sprung mass.

Shock absorbers are frequently incorporated as a component in a larger shock absorber assembly, which may additionally include mounting fixtures, electromechanical valves to control dampening forces, and spring assemblies. Such spring assemblies can include coil-over springs that extend helically about a portion of the shock absorber or air springs that may include an air bladder that extended annularly about a portion of the shock absorber.

SUMMARY

This section provides a general summary of the disclosure and is not a comprehensive disclosure of its full scope or all of its features.

In accordance with one aspect of the subject disclosure, a shock absorber assembly is provided, which includes a shock absorber with a sliding piston that divides the shock absorber into first and second working chambers. A piston rod is mounted to the sliding piston and the shock absorber assembly has a lower housing opposite the piston rod. One or more hydraulic ports are provided in the lower housing of the shock absorber. One or more hydraulic port protection plugs are provided to seal the hydraulic port(s) in the lower housing during shipping, handling, and storage of the shock absorber assembly before it is installed on a vehicle. The hydraulic port protection plugs have a tubular body with a geometric configuration that is configured to be inserted into the hydraulic port(s) in the lower housing and prevent contaminants from entering the hydraulic port(s) of the shock absorber, while also preventing any residual oil from leaking from the shock absorber assembly during shipping, handling, and storage. In addition, the hydraulic port protection plug(s) are designed to be left installed in the hydraulic port(s) when one or more hydraulic fittings and hydraulic lines are connected to the shock absorber. As a result, the hydraulic port protection plug(s) remain installed in the hydraulic port(s) after the hydraulic fittings are installed and the shock absorber is installed in the vehicle.

Each hydraulic port protection plug includes a pierceable seal that is configured to receive an inboard portion of the hydraulic fitting. The pierceable seal is designed so that the inboard portion of the hydraulic fitting may be inserted through the pierceable seal of the hydraulic port protection plug and into the hydraulic port in the lower housing such that the hydraulic port protection plug does not have to be removed and seals the hydraulic fitting within the hydraulic port in the shock absorber in an installed position.

In accordance with another aspect of the subject disclosure, the shock absorber assembly includes a shock absorber with a sliding piston that divides the shock absorber into first and second working chambers, a piston rod mounted to the sliding piston, a lower housing opposite the piston rod, a hydraulic port in the lower housing of the shock absorber, and a hydraulic coupling that is configured to mate with the hydraulic port in the lower housing of the shock absorber. Again, a hydraulic port protection plug is provided to seal the hydraulic port in the lower housing during shipping, handling, and storage of the shock absorber assembly before it is installed on a vehicle. The hydraulic port protection plug has a tubular body with a geometric configuration that is configured to be inserted into the hydraulic port in the lower housing of the shock absorber. The hydraulic port protection plug also includes a pierceable seal that is configured to receive an insertable portion of the hydraulic coupling such that the hydraulic port protection plug seals the hydraulic fitting within the at least one hydraulic port in the lower housing in an installed position.

In accordance with another aspect of the subject disclosure, a method of assembling a shock absorber assembly using the hydraulic port protection plug described above is also provided. The method comprises the steps of: installing a piston and a piston rod inside a shock absorber housing, inserting a hydraulic port protection plug into the hydraulic port in the shock absorber housing to place the shock absorber assembly in a shipping and handling configuration, installing the shock absorber assembly in a vehicle, and installing a hydraulic fitting in the hydraulic port while the hydraulic port protection plug is positioned in the hydraulic port by pressing at least a portion of the hydraulic fitting through a pierceable seal in the hydraulic port protection plug.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustration purposes only and are not intended to limit the scope of the present disclosure in any way.

FIG. 3 is a top perspective view of one of the exemplary hydraulic port protection plugs illustrated in FIG. 2;

FIG. 4 is a bottom perspective view of the exemplary hydraulic port protection plug illustrated in FIG. 3;

FIGS. 18A and 18B are enlarged cross-sectional views of the lower housing of the shock absorber assembly shown in FIG. 1 and illustrate the hydraulic port protection plug of FIG. 17 shown inserted in a hydraulic port in the lower housing with an exemplary fitting being pushed into the hydraulic port protection plug;

FIGS. 19A and 19B are enlarged cross-sectional views of the lower housing of the shock absorber assembly shown in FIG. 1 and illustrate another exemplary hydraulic port protection plug shown inserted in a hydraulic port in the lower housing with another exemplary fitting being pushed through a fitting piercing zone in the hydraulic port protection plug;

FIG. 22 is a flow diagram illustrating the steps of another exemplary method for assembling the exemplary shock absorber assembly shown in FIG. 1.

DETAILED DESCRIPTION

Figure 1:
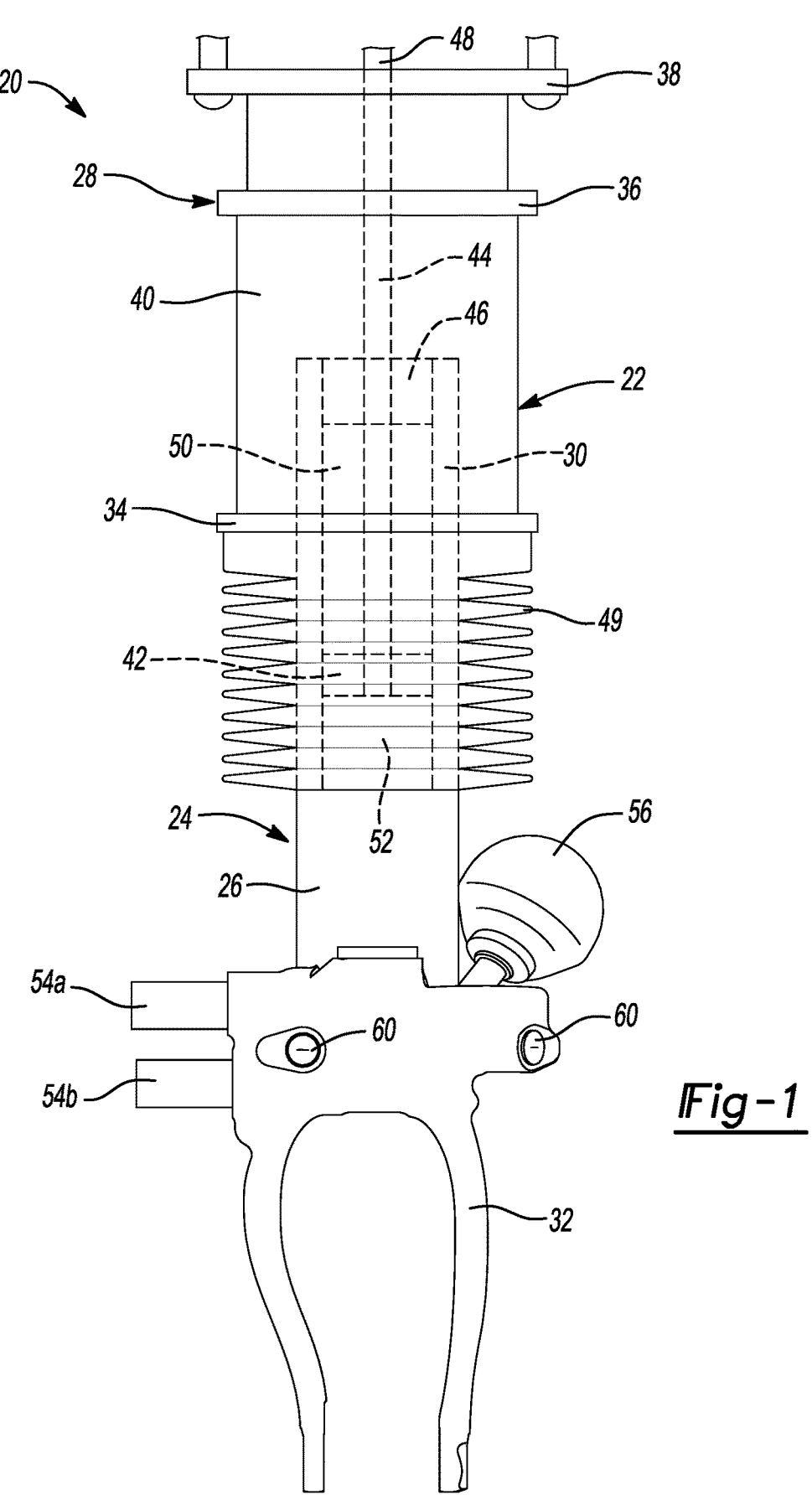
FIG. 1 is a side elevation view of an exemplary shock absorber assembly that has been constructed in accordance with the present disclosure.

The following description is merely exemplary in nature and is not intended to limit the present disclosure, application, or uses.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the shock absorber assembly 20 that is showing in the Figures is turned over, the element described a "lower housing" would then be oriented "above" other elements or features. Thus, the example term "lower" can encompass both lower and upper orientations depending on the orientation of the shock absorber assembly 20, which may be otherwise oriented than the orientations shown in the Figures (e.g., rotated 90 or 180 degrees or at other orientations) and the spatially relative descriptors used herein should be interpreted accordingly.

FIG. 1 illustrates an exemplary pre-installation shock absorber assembly 20, which includes a spring 22 that extends annularly about a shock absorber 24 to form the overall shock absorber assembly 20. It should be appreciated that the shock absorber assembly 20 is configured to be installed in a vehicle as part of a suspension system. It should also be appreciated that the shock absorber assembly 20 illustrated in FIG. 1 is shown in a pre-installation configuration, state, or condition and is therefore pictured before installation in a vehicle. It should also be understood that the shock absorber assembly 20 will typically be shipped, handled, and stored in this pre-installation configuration, state, or condition, where the shock absorber 24 is not yet filled with a working volume of hydraulic fluid or oil, although there may be some residual fluid or oil in the shock absorber 24 from assembly and/or testing.

The shock absorber assembly 20 includes a lower housing 26 and an upper assembly 28. The lower housing 26 is formed by a pressure tube 30 of the shock absorber 24 and a mounting fixture 32. In the illustrated embodiment, the mounting fixture 32 is provided in the form of a yoke; however, it should be appreciated that the mounting fixture 32 may be provided in the form of other types/styles of attachment structures. Regardless of type, the mounting fixture 32 is configured to attach to an un-sprung component of the vehicle, such as an axle, wheel knuckle, or lower swing-arm. The upper assembly 28 is formed by the spring 22, a lower spring seat 34, an upper spring seat 36, and a top mount 38. The top mount 38 comprises an integral molded body and a rigid body member typically made of stamped steel. Top mount 38 is therefore configured to mount to a sprung component of the vehicle, such as a shock tower in a body of the vehicle.

A rubber dust boot 49 may be provided to cover the spring 22 and a telescoping portion of shock absorber 24 to protect the spring 22 and the shock absorber 24 from dirt, water, and other contamination. Although other types of springs may be used, including a coil spring for example, the spring 22 in the illustrated example is an air spring that includes an air bladder 40 that extends annularly about an upper portion of the shock absorber 24 and longitudinally between the lower and upper spring seats 34, 36.

The shock absorber 24 includes a sliding piston 42 that is disposed in sliding engagement within the pressure tube 30, a piston rod 44 that is attached to the sliding piston 42, and a rod guide 46 that is positioned in an upper end of the pressure tube 30. The piston rod 44 extends from the sliding piston 42 in an upward manner, through the rod guide 46, and to an upper rod end 48. The upper rod end 48 attaches to the top mount 38 and therefore to the sprung component of the vehicle.

The sliding piston 42 is slidably disposed within the pressure tube 30 and divides an inner volume of the pressure tube 30 into a first working chamber 50 and a second working chamber 52. The piston rod 44 is attached to sliding piston 42 and extends through the first working chamber 50 and through the rod guide 46, which closes an upper end of the first working chamber 50.

During compression and extension (e.g., rebound) movements of the shock absorber 24, hydraulic fluid or oil moves from either the first working chamber 50 to the second working chamber 52 or from the second working chamber 52 to the first working chamber 50. This provides dampening, which can be plotted on frequency versus dissipation response curves, that continues to rise at an ever increasing rate as the frequency of the damped vibration increases. The shock absorber assembly 20 has externally mounted electromechanical valves 54a, 54b for dynamically controlling the fluid flow between the first and second working chambers 50, 52 and therefore the dampening rate of the shock absorber 24. The shock absorber assembly 20 also includes an externally mounted accumulator 56. In operation, hydraulic fluid or oil is permitted to flow between the accumulator 56 and the shock absorber 24 to provide pressure and temperature compensation.

Figure 2:
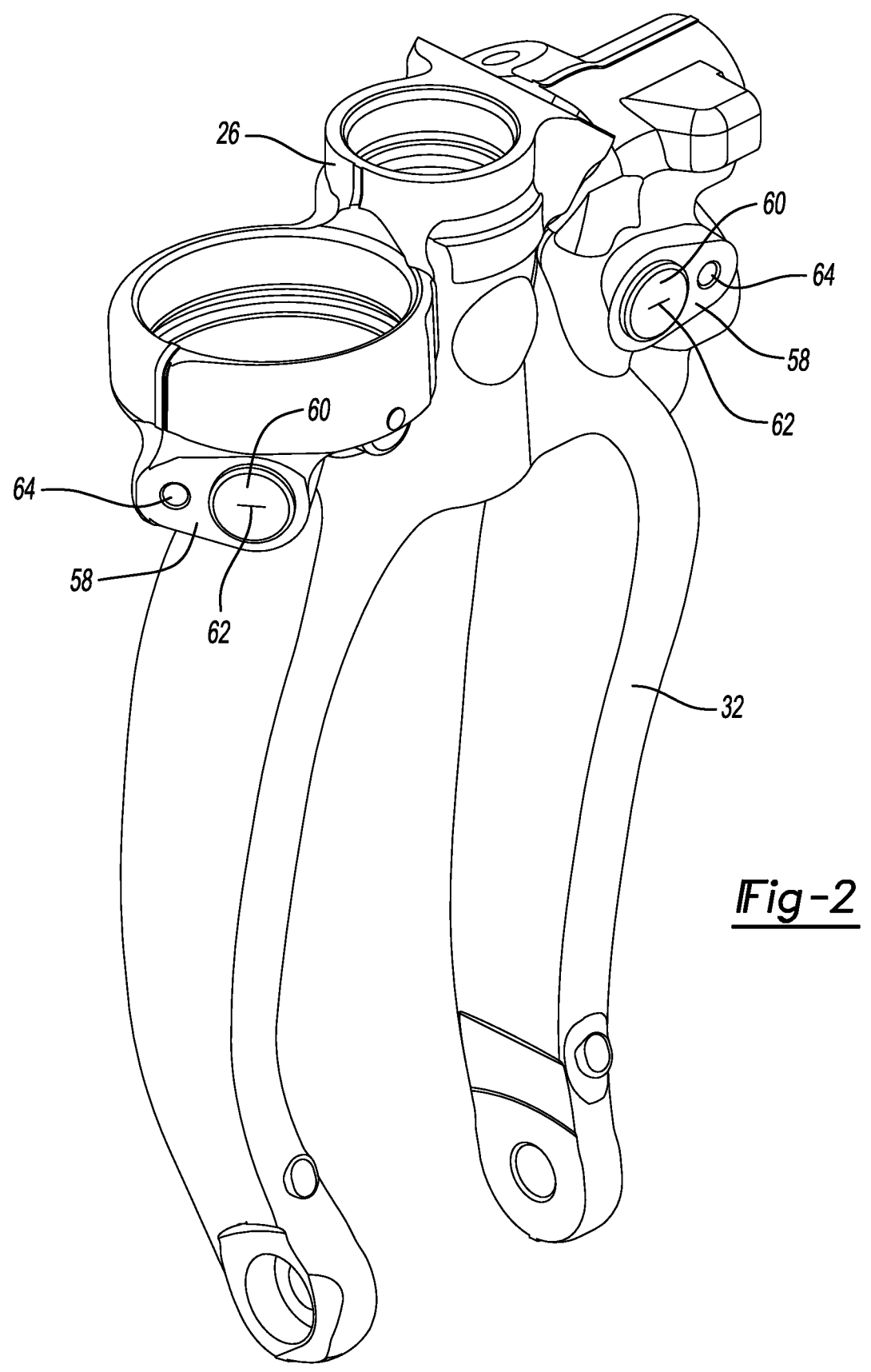
FIG. 2 is an enlarged perspective view of a lower housing and yoke of the exemplary shock absorber assembly illustrated in FIG. 1 where a pair of exemplary hydraulic port protection plugs are shown installed in two respective hydraulic ports in the lower housing.

FIG. 2 illustrates part of the lower housing 26 of the shock absorber assembly 20, which includes the mounting fixture 32 (i.e., the yoke). The lower housing 26 includes a pair of hydraulic port lands 58 and a pair of hydraulic port protection plugs 60 that are seated in the hydraulic port lands 58. As will be discussed in greater detail below, each hydraulic port protection plug 60 has a self-closing pressure relief opening 62 that is configured to open and close in response to pressure changes resulting from pressurization or depressurization of the shock absorber 24 and/or movement of the piston 42 and the piston rod 44 during or after assembly and after installation of the hydraulic port protection plugs 60. Thus, it should be appreciated that the hydraulic port protection plugs 60 are designed and configured to be installed on the hydraulic port lands 58 of the lower housing 26 of the shock absorber 24 when the shock absorber 24 is in a pre-installation condition and does not contain a working volume of oil. In this sense, the hydraulic port protection plugs 60 can be considered as shipping plugs and/or storage plugs and are designed and intended to be removed when the shock absorber assembly 20 is being installed in a vehicle and subsequently filled with a working volume of hydraulic fluid or oil. In other words, the hydraulic port protection plugs 60 are not designed or intended to remain installed on the shock absorber 24 after the shock absorber assembly 20 has been fully installed on the vehicle. This is because hydraulic fittings and hydraulic lines of hydraulic cross-over circuits are intended to be attached to the hydraulic port lands 58 when the shock absorber assembly 20 is fully installed on the vehicle.

Each hydraulic port land 58 also includes a threaded bore 64 for use in attaching a pressurizing tool assembly (shown in FIGS. 8A-11A) to each hydraulic port land 58. As will be explained in greater detail below, the hydraulic port protection plugs 60 are also designed and configured to be installed on the hydraulic port lands 58 of the lower housing 26 of the shock absorber 24 before the shock absorber 24 is charged with pressurized air or gas during the assembly process. This is different from traditional shipping plugs, which cannot be installed prior to charging/pressurization because traditional shipping plugs do not have any openings to permit the passage of pressurized air or gas. Traditional shipping plugs also suffer from the problem of becoming unseated/blowing out from the hydraulic port land 58 if the piston rod 44 is moved after the shipping plugs are installed due to the pressure generated by the piston 42 in the first and/or second working chambers 50, 52. The hydraulic port protection plugs 60 described herein solve these problems and therefore allow for higher cleanliness specifications because the self-closing pressure relief opening 62 allows air and/or pressurized gas to flow through the hydraulic port protection plugs 60 during the pressurization or depressurization of the shock absorber 24 and/or during movements of the piston 42 and the piston rod 44 during or after assembly and after installation of the hydraulic port protection plugs 60. Due to the geometrical shape and internal drillings of the shock absorber assembly 20, it can be difficult to drain hydraulic fluid or oil from the shock absorber assembly 20 before inserting the hydraulic port protection plugs 60. So, in addition to preventing contaminants from entering the shock absorber 24, the self-closing pressure relief opening 62 also prevents any residual hydraulic fluid or oil remaining in the shock absorber 24 from assembly or testing from leaking out during shipping, handling, or storage. Thus, over time, a small column of hydraulic fluid or oil may accumulate behind the hydraulic port protection plugs 60 after they are installed.

Referring to FIGS. 3 and 4, the hydraulic port protection plug 60 includes a cap portion 66 and tubular body 68. The cap portion 66 has a disc-shaped end wall 70. The tubular body 68 extends from the end wall 70 of the cap portion 66 to define an open-ended cavity 72 within the tubular body 68. Thus, the open-ended cavity 72 has one open end that is open and an opposite end that is bounded by the end wall 70 of the cap portion 66. The tubular body 68 has a body diameter BD. The disc-shaped end wall 70 of the cap portion 66 extends radially outwardly from the tubular body 68 to define a cap diameter CD that is larger than the body diameter BD.

The self-closing pressure relief opening 62 extends through the disc-shaped end wall 70 of the cap portion 66 and is arranged in fluid communication with the open-ended cavity 72 in the tubular body 68. In the embodiment shown in FIGS. 2-4, the self-closing pressure relief opening 62 is a linear slit that extends through the end wall 70 of the cap portion 66, but as will be discussed in more detail below, the self-closing pressure relief opening 62 may have other configurations. At least a portion of the disc-shaped end wall 70 of the cap portion 66 is made of an elastic material that permits the self-closing pressure relief opening 62 to open and close in response to pressure changes. This functionality is explained in greater detail below. By way of example and without limitation, the elastic material may be nitrile butadiene rubber (NBR) with a durometer of approximately 70 Shore, which is sufficient to prevent unwanted leakage through the self-closing pressure relief opening 62.

Figures 5A, 5B, 6A, 6B, 7A, 7B:
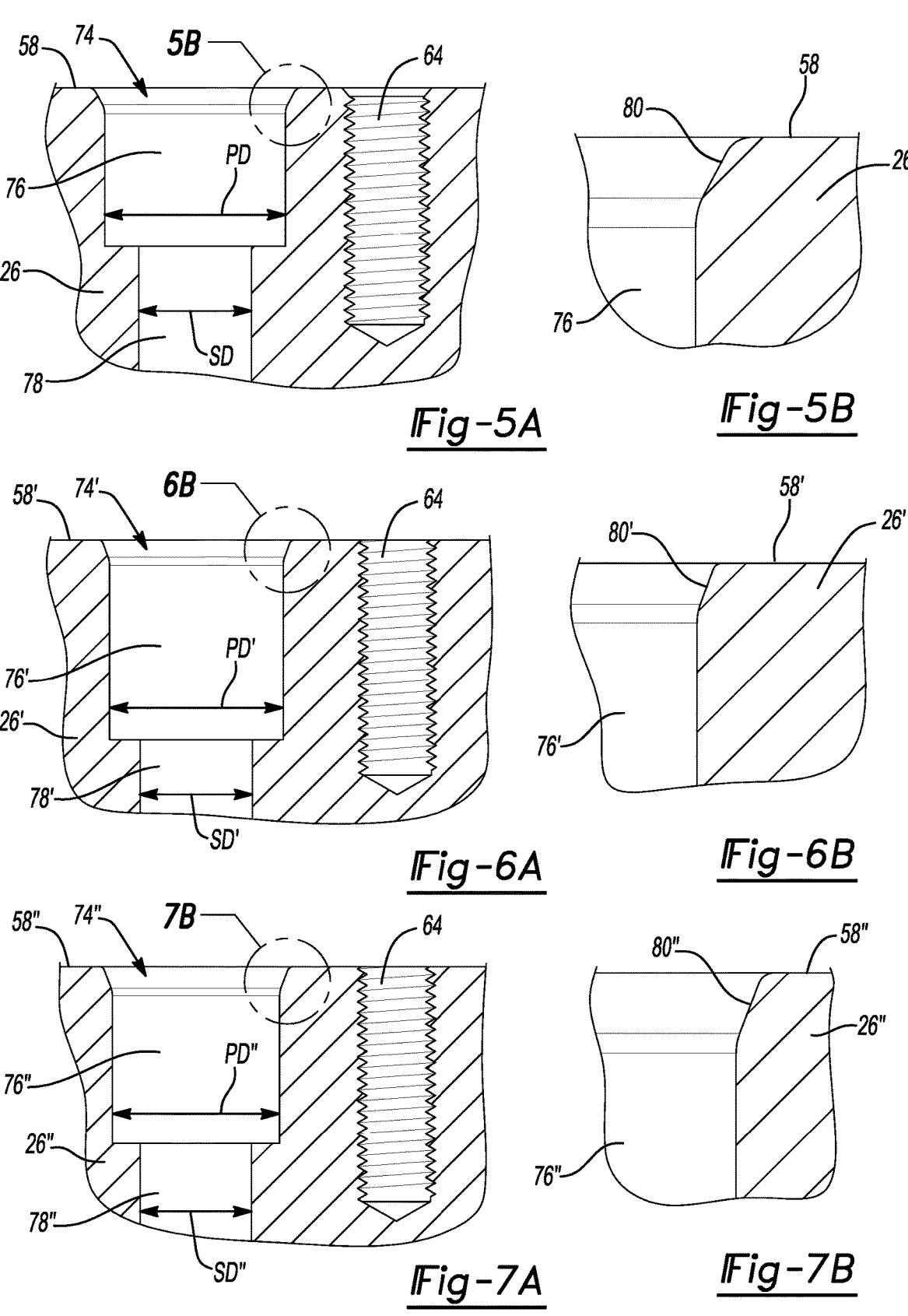
FIGS. 5A and 5B are enlarged cross-sectional views of the lower housing of the exemplary shock absorber assembly shown in FIG. 1 and illustrate the geometry of an exemplary hydraulic port provided therein.
FIGS. 6A and 6B are enlarged cross-sectional views of the lower housing of the exemplary shock absorber assembly shown in FIG. 1 and illustrate the geometry of another exemplary hydraulic port provided therein.
FIGS. 7A and 7B are enlarged cross-sectional views of the lower housing of the shock absorber assembly shown in FIG. 1 and illustrate the geometry of another exemplary hydraulic port provided therein.

With reference to FIGS. 5A-5B, each hydraulic port land 58 on the lower housing 26 of the shock absorber assembly 20 includes a hydraulic port 74 next to the threaded bore 64. Both the hydraulic port 74 and the threaded bore 64 extend into the lower housing 26. The threaded bore 64 terminates at a closed end. By contrast, the hydraulic port 74 is arranged in fluid communication with one of the first and second working chambers 50, 52 of the shock absorber 24. The hydraulic port 74 is configured to receive a hydraulic fitting coupled to the hydraulic line of a hydraulic cross-over circuit that is connected to one or more other shock absorbers 24 of the vehicle. Thus, the hydraulic port 74 is a stepped bore that includes a primary opening 76, a smaller secondary opening 78, and a chamfered rim 80.

The size and geometry of the primary opening 76, secondary opening 78, and chamfered rim 80 of the hydraulic port 74 may vary to correspond to a particular hydraulic fitting. In the example shown in FIGS. 5A-5B, the primary opening 76 of the hydraulic port 74 has a primary opening diameter PD of approximately 16 millimeters (mm) and the secondary opening 78 has a secondary opening diameter SD of approximately 10 millimeters (mm). In the example shown in FIGS. 6A-6B, the primary opening 76' of the hydraulic port 74' has a primary opening diameter PD' of approximately 17 millimeters (mm) and the secondary opening 78' has a secondary opening diameter SD' of approximately 10 millimeters (mm). In addition, the chamfered rim 80' in the hydraulic port land 58' on the lower housing 26' shown in FIGS. 6A-6B has a different geometry than the example shown in FIGS. 5A-5B. In the example shown in FIGS. 7A-7B, the primary opening 76" of the hydraulic port 74" has a primary opening diameter PD" of approximately 15 millimeters (mm) and the secondary opening 78" has a secondary opening diameter SD" of approximately 10 millimeters (mm). In addition, the chamfered rim 80" in the hydraulic port land 58" on the lower housing 26" shown in FIGS. 7A-7B has a different geometry than the examples shown in FIGS. 5A-5B and FIGS. 6A-6B. It should be appreciated that the various sizes and geometries described herein are merely exemplary in nature and are not limiting. However, it should be appreciated that an advantage of the hydraulic port protection plugs 60 described herein is that they are designed to be insertable and adequately retained in hydraulic ports 74, 74', 74" of several different sizes and geometries and therefore can work in a wider range of applications than traditional plugs. This means that fewer sizes and variations are required to cover a range of different hydraulic ports 74, 74', 74", which translates into cost savings and assembly line advantages.

Figure 8A:
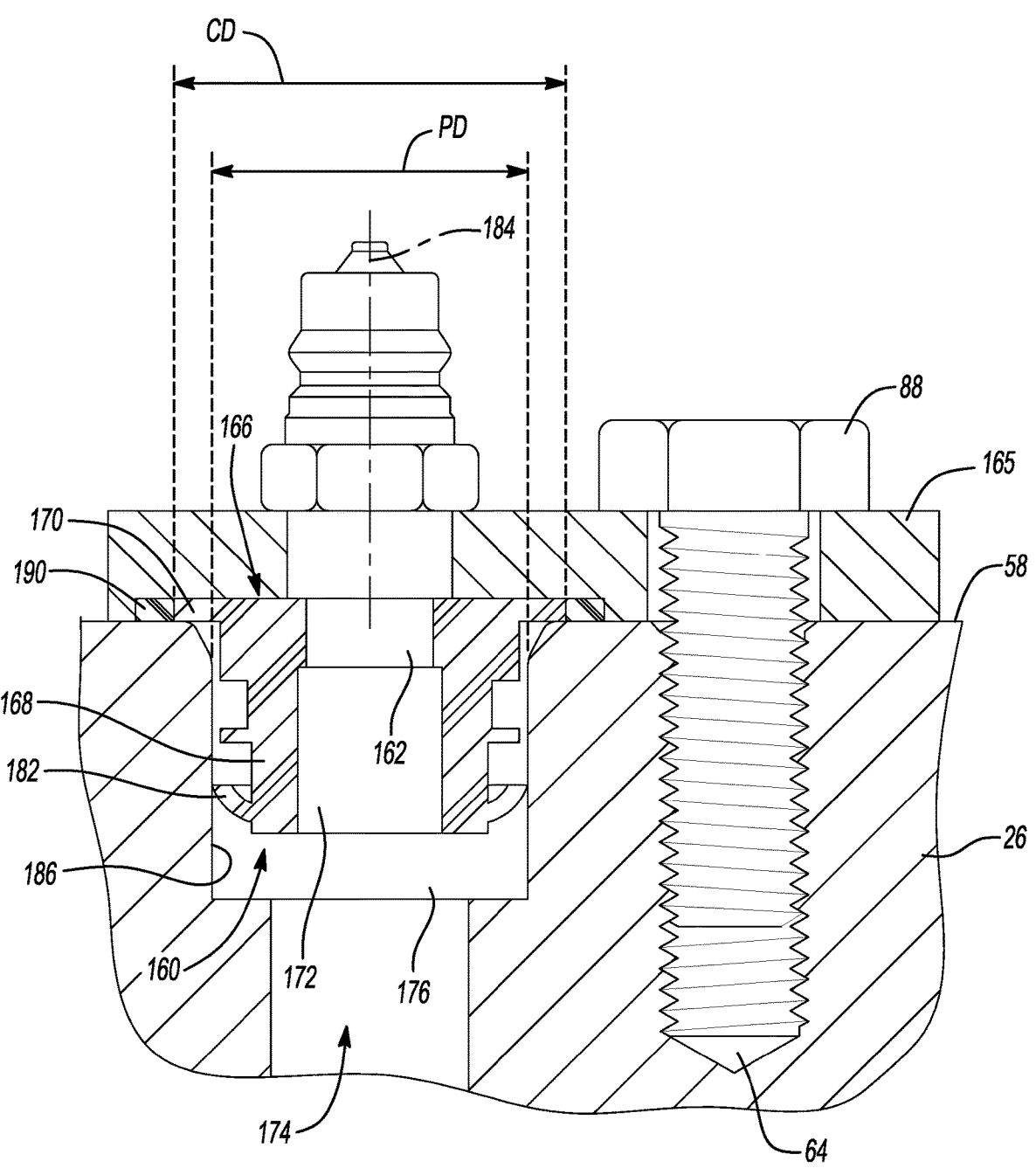
FIG. 8A is an enlarged cross-sectional view of the lower housing of the exemplary shock absorber assembly shown in FIG. 1 and illustrates an exemplary hydraulic port protection plug that is installed in an exemplary hydraulic port in the lower housing.
Figure 8B:
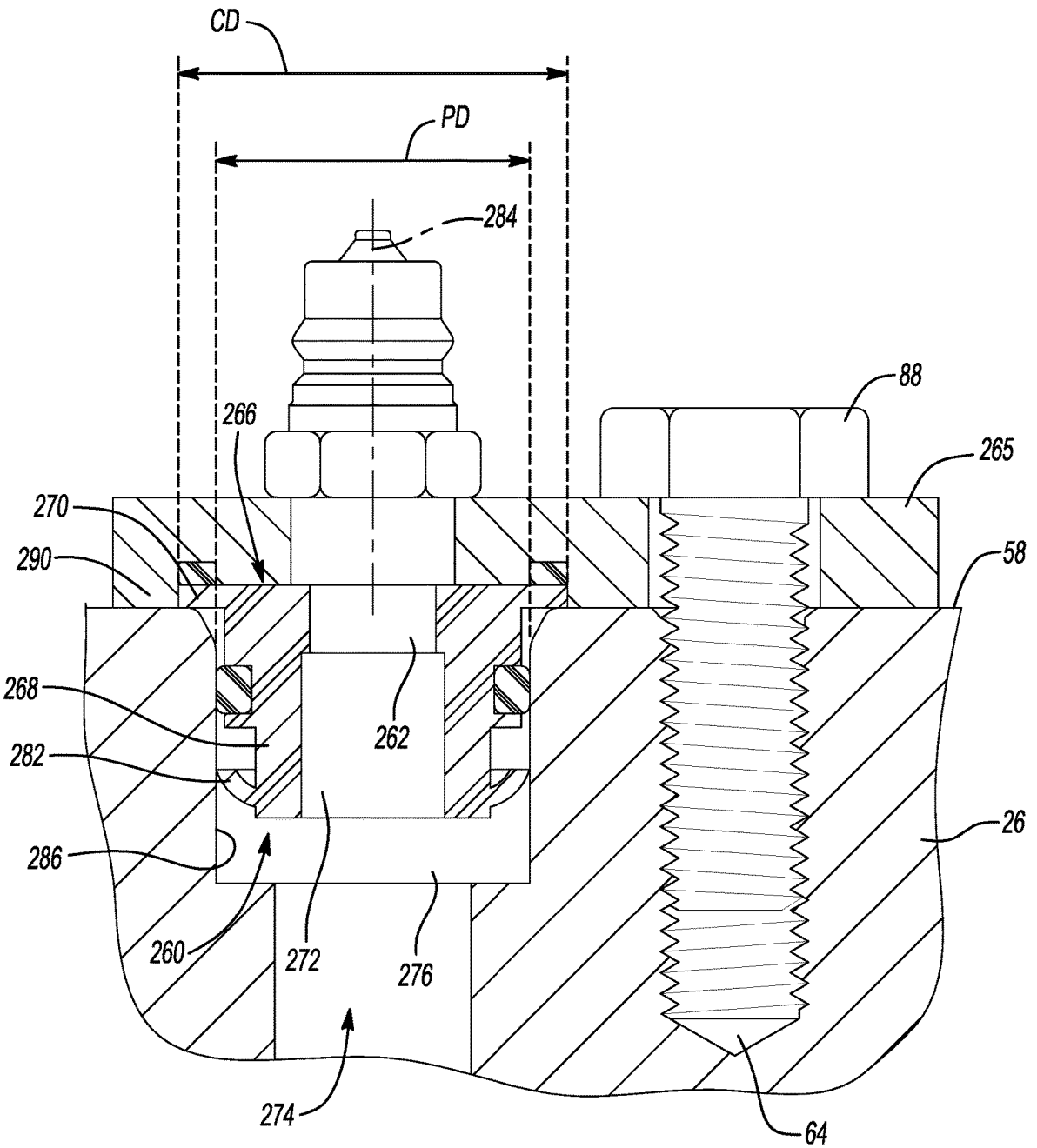
FIG. 8B is an enlarged cross-sectional view of the lower housing of the exemplary shock absorber assembly shown in FIG. 1 and illustrates another exemplary hydraulic port protection plug that is installed in an exemplary hydraulic port in the lower housing.

FIGS. 8A-8B illustrate two different configurations of hydraulic port protection plugs 160, 260, where each hydraulic port protection plugs 160, 260 has a self-closing pressure relief opening 162, 262 in the form of a linear slit. The hydraulic port protection plugs 160, 260 also have a cap portion 166, 266 and a tubular body 168, 268. The tubular body 168, 268 extends from the cap portion 166, 266 and has a geometric configuration that is configured to be insertable into a primary opening 176, 276 in a hydraulic port 174, 274 provided in the lower housing 26 of the shock absorber assembly 20. The primary opening 176, 276 in the hydraulic port 174, 274 has a primary opening diameter PD. The cap portion 166, 266 of the hydraulic port protection plugs 160, 260 includes an end wall 170, 270 and the tubular body 168, 268 extends from the end wall 170, 270 to define an open-ended cavity 172, 272 within the tubular body 168, 268 that is bounded at one end by the end wall 170, 270. The end wall 170, 270 of the cap portion 166, 266 extends radially outward from the tubular body 168, 268 to define a cap diameter CD that is larger than the primary opening diameter PD.

The tubular body 168, 268 of the hydraulic port protection plugs 160, 260 shown in FIGS. 8A-8B also include a deflectable flange 182, 282 that extends outwardly from the tubular body 168, 268 at a location that is longitudinally spaced from the end wall 170, 270. Stated another way, the deflectable flange 182, 282 extends radially outward away from a centerline 184, 284 of the hydraulic port protection plugs 160, 260 and is configured to seal against an inner surface 186, 286 of the hydraulic ports 174, 274 in the lower housing 26 of the shock absorber assembly 20.

FIGS. 8A-8B illustrate a pressurizing tool assembly 165, 265 that is secured in an abutting arrangement with the hydraulic port land 58 on the lower housing 26 by a bolt 88 that screws into the threaded bore 64 in the hydraulic port land 58. At least a portion of the cap portion 166, 266 of the hydraulic port protection plugs 160, 260 is made of an elastic material that permits the self-closing pressure relief opening 162, 262 to open when pressurized air or gas is supplied to the pressurizing tool assembly 165, 265. When this occurs, the pressurized air or gas passes through the self-closing pressure relief opening 162, 262 and into the hydraulic ports 174, 274 thereby pressurizing the first and/or second working chambers 50, 52 of the shock absorber 24. Pressurized air or gas may flow in the opposite direction if negative pressure (e.g., vacuum pressure) is applied to the pressurizing tool assembly 165, 265 to depressurize the first and/or second working chambers 50, 52 of the shock absorber 24. When the pressurizing tool assembly 165, 265 is removed, the elastic/resilient properties of the cap portion 166, 266 of the hydraulic port protection plugs 160, 260 permits pressure to bleed out from the hydraulic ports 174, 274 through the self-closing pressure relief openings 162, 262 if pressure increases in the hydraulic ports 174, 274 as a result of movement of the piston 42 and the piston rod 44 after the hydraulic port protection plugs 174, 274 are inserted into the hydraulic ports 174, 274. For example, if the piston rod 44 is extended, the pressure in the first working chamber 50 may increase and increase the pressure in the hydraulic port 174, 274 that is connected in fluid communication with the first working chamber 50. Conversely, if the piston rod 44 is compressed, the pressure in the second working chamber 52 may increase and increase the pressure in the hydraulic port 174, 274 that is connected in fluid communication with the second working chamber 52. The elastic/resilient properties of the cap portion 166, 266 of the hydraulic port protection plugs 160, 260 permits pressure to bleed out from the hydraulic ports 174, 274 through the self-closing pressure relief openings 162, 262. This prevents the hydraulic port protection plugs 160, 260 from blowing out of the hydraulic ports 174, 274 when the piston rod 44 is extended or compressed. It also enables the piston rod 44 of the shock absorber assembly 20 to be moved to a fully compressed travel position for shipment, which reduces the overall length of the shock absorber assembly 20 during shipping, to reduce packaging and shipping costs.

FIGS. 8A and 8B differ in that they illustrate different sealing arrangements. In FIG. 8A, the pressurizing tool assembly 165 includes an O-ring seal 190 that extends annually about and is radially outward of the cap portion 166 of the hydraulic port protection plug 160. In FIG. 8B, the pressurizing tool assembly 265 includes an O-ring seal 290 that is positioned to abut the disc-shaped end wall 270 of the cap portion 266 of the hydraulic port protection plug 260. In addition, the tubular body 268 of the hydraulic port protection plug 260 shown in FIG. 8B has an annular groove 292 that retains another O-ring seal 294 that is arranged to contact and seal against the inner surface 286 of the hydraulic port 274. Other than those differences, the hydraulic port protection plugs 160, 260 shown in FIGS. 8A and 8B are structurally similar and function in similar ways.

Figure 9A:
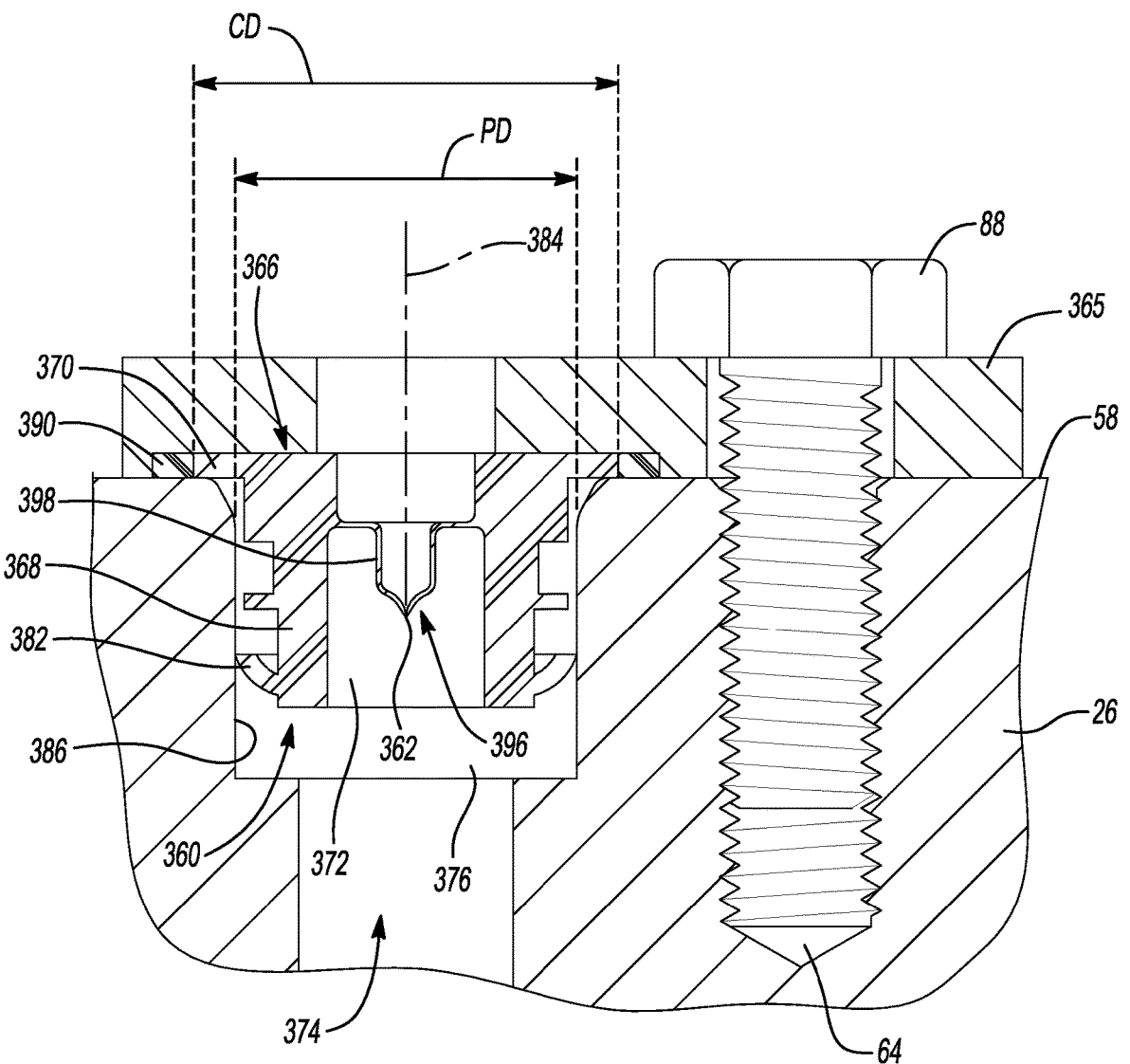
FIG. 9A is an enlarged cross-sectional view of the lower housing of the exemplary shock absorber assembly shown in FIG. 1 and illustrates another exemplary hydraulic port protection plug that is installed in an exemplary hydraulic port in the lower housing.
Figure 9B:
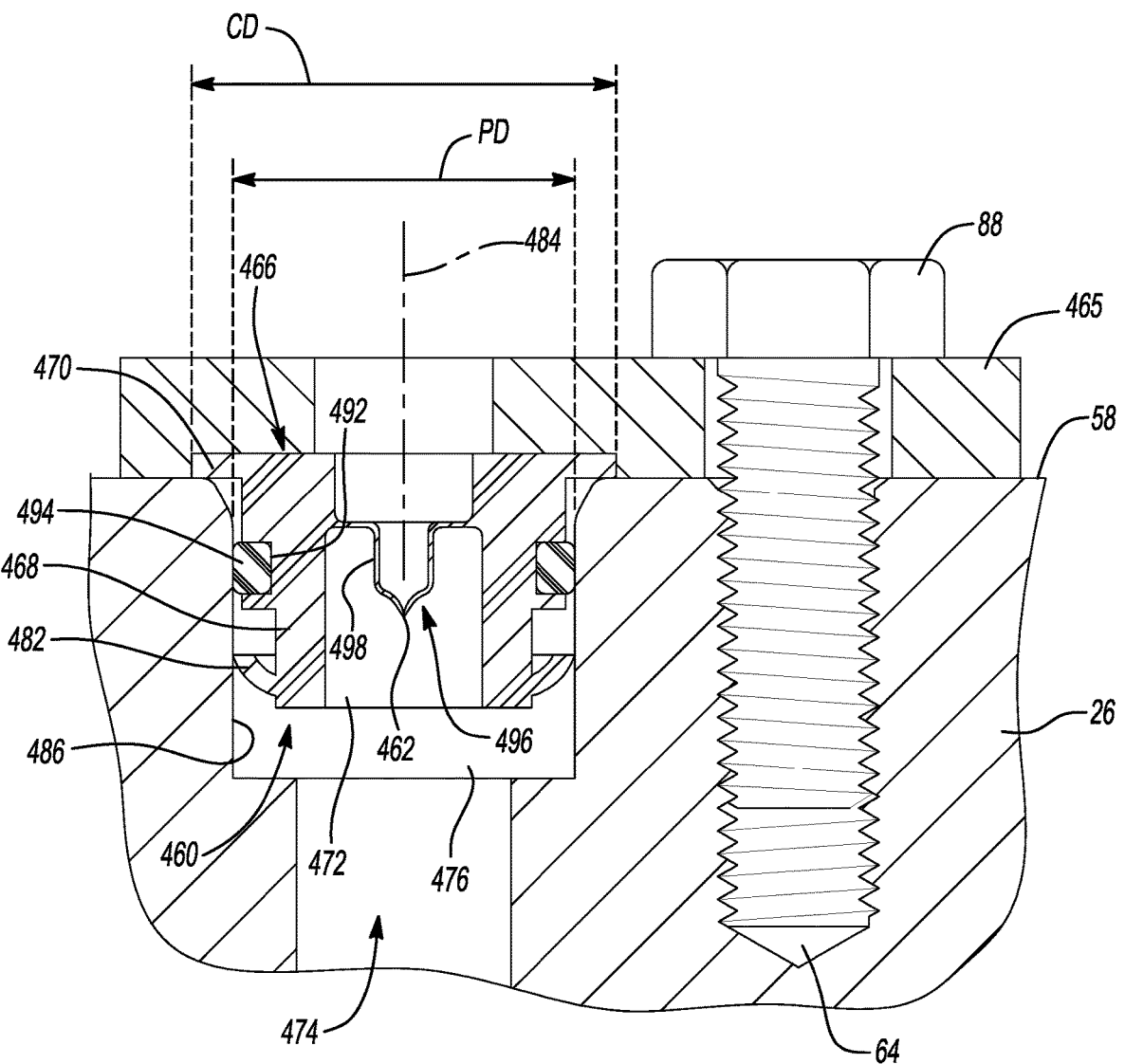
FIG. 9B is an e enlarged cross-sectional view of the lower housing of the exemplary shock absorber assembly shown in FIG. 1 and illustrates another exemplary hydraulic port protection plug that is installed in an exemplary hydraulic port in the lower housing.

FIGS. 9A and 9B illustrate two alternative configurations for the hydraulic port protection plugs 360, 460, where each hydraulic port protection plug 360, 460 has a self-closing pressure relief opening 362, 462 that is included in a one-way joker valve 396, 496. The hydraulic port protection plugs 360, 460 also have a cap portion 366, 466 and a tubular body 368, 468. The tubular body 368, 468 extends from the cap portion 366, 466 and has a geometric configuration that is configured to be insertable into a primary opening 376, 476 in a hydraulic port 374, 474 provided in the lower housing 26 of the shock absorber assembly 20. The primary opening 376, 476 in the hydraulic port 374, 474 has a primary opening diameter PD. The cap portion 366, 466 of the hydraulic port protection plugs 360, 460 includes an end wall 370, 470 and the tubular body 368, 468 extends from the end wall 370, 470 to define an open-ended cavity 372, 472 within the tubular body 368, 468 that is bounded at one end by the end wall 370, 470. The end wall 370, 470 of the cap portion 366, 466 extends radially outward from the tubular body 368, 468 to define a cap diameter CD that is larger than the primary opening diameter PD.

The tubular body 368, 468 of the hydraulic port protection plugs 360, 460 shown in FIGS. 9A-9B also include a deflectable flange 382, 482 that extends outwardly from the tubular body 368, 468 at a location that is longitudinally spaced from the end wall 370, 470. Stated another way, the deflectable flange 382, 482 extends radially outward away from a centerline 384, 484 of the hydraulic port protection plugs 360, 460 and is configured to seal against an inner surface 386, 486 of the hydraulic ports 374, 474 in the lower housing 26 of the shock absorber assembly 20.

FIGS. 9A-9B illustrate a pressurizing tool assembly 365, 465 that is secured in an abutting arrangement with the hydraulic port land 58 on the lower housing 26 by a bolt 88 that screws into the threaded bore 64 in the hydraulic port land 58. The one-way joker valves 396, 496 include an elastic valve throat 398, 498 that extends from the end wall 370, 470 into the open-ended cavity 372, 472 and is therefore concentrically arranged within the tubular body 368, 468 of the hydraulic port protection plugs 360, 460. The elastic/resilient properties of the valve throat 398, 498 permits the self-closing pressure relief opening 162, 262 at the end/tip of the valve throat 398, 498 to open when pressurized air or gas is supplied to the pressurizing tool assembly 365, 465, which allows the shock absorber 24 to be charged after the hydraulic port protection plugs 360, 460 are installed in the hydraulic ports 174, 274 without removal.

FIGS. 9A and 9B differ in that they illustrate different sealing arrangements. In FIG. 9A, the pressurizing tool assembly 365 includes an O-ring seal 390 that extends annually about and is radially outward of the cap portion 366 of the hydraulic port protection plug 360. By contrast, in FIG. 9B, the tubular body 468 of the hydraulic port protection plug 460 has an annular groove 492 that retains an O-ring seal 494 that is arranged to contact and seal against the inner surface 486 of the hydraulic port 474. Other than those differences, the hydraulic port protection plugs 360, 460 shown in FIGS. 9A and 9B are structurally similar and function in similar ways.

Figure 10:
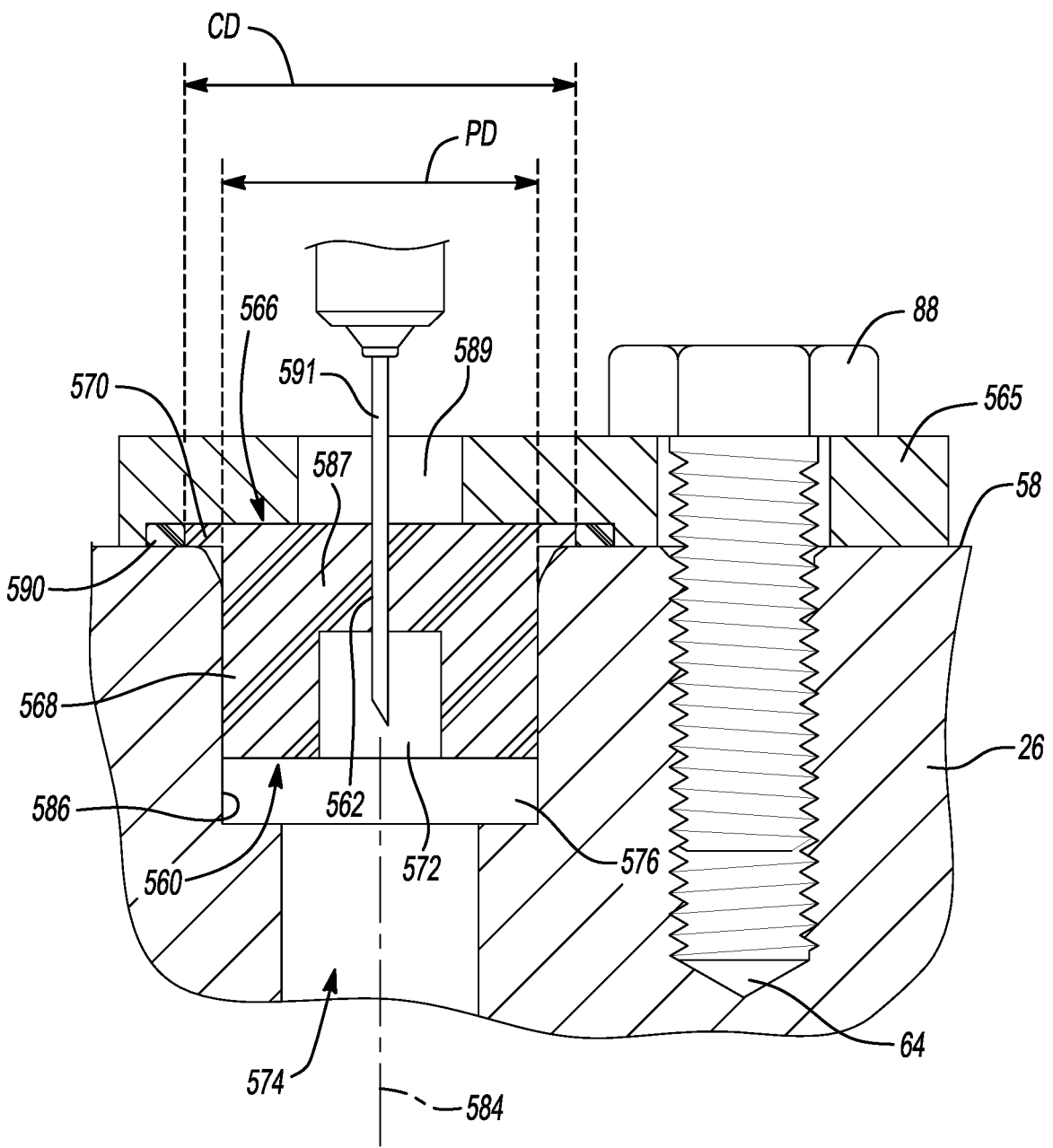
FIG. 10 is an enlarged cross-sectional view of the lower housing of the exemplary shock absorber assembly shown in FIG. 1 and illustrates another exemplary hydraulic port protection plug that is installed in an exemplary hydraulic port in the lower housing.

FIG. 10 illustrates another alternative configuration for a hydraulic port protection plug 560, where a self-closing pressure relief opening 562 is provided by a resealable needle piercing zone 587 in the hydraulic port protection plug 560. The hydraulic port protection plugs 560 has a cap portion 566 and a tubular body 568. The tubular body 568 extends from the cap portion 566 and has a geometric configuration that is configured to be insertable into a primary opening 576 in a hydraulic port 574 provided in the lower housing 26 of the shock absorber assembly 20. The primary opening 576 in the hydraulic port 574 has a primary opening diameter PD. The cap portion 566 of the hydraulic port protection plugs 560 includes an end wall 570 and the tubular body 568 extends from the end wall 570 to define an open-ended cavity 572 within the tubular body 568 that is bounded at one end by the end wall 570. The end wall 570 of the cap portion 566 extends radially outward from the tubular body 568 to define a cap diameter CD that is larger than the primary opening diameter PD.

FIG. 10 illustrates a pressurizing tool assembly 565 that is secured in an abutting arrangement with the hydraulic port land 58 on the lower housing 26 by a bolt 88 that screws into the threaded bore 64 in the hydraulic port land 58. The pressurizing tool assembly 565 includes an O-ring seal 590 that extends annually about and is radially outward of the cap portion 566 of the hydraulic port protection plug 560. At least a portion of the end wall 570 of the cap portion 566 is made of a resilient material in the resealable needle piercing zone 587, which is arranged at or near a centerline 584 of the hydraulic port protection plug 560. Optionally, a detent 589 may be provided in the end wall 570 of the cap portion 566 that is aligned with the centerline 584 and resealable needle piercing zone 587 to ensure proper alignment between needle 591 and the resealable needle piercing zone 587. When a needle 591 is inserted into the resealable needle piercing zone 587, pressurized air or gas that is supplied to the pressurizing tool assembly 165, 265 may pass through the self-closing pressure relief opening 562 formed by the needle 591. Similarly, the needle 591 may be inserted into the resealable needle piercing zone 587 to bleed pressure from the hydraulic port 574 to accommodate movement of the piston 42 and the piston rod 44. The needle 591 or a similar extraction tool may also be used as a suction device to suck out any hydraulic fluid or oil remaining in the hydraulic port 574 before the hydraulic port protection plug 560 is removed at the car manufacturing line. This aspect, which can be utilized across all embodiments described herein, provides the added benefit of a cleaner environment at the car manufacturing line.

Figures 11A, 11B:
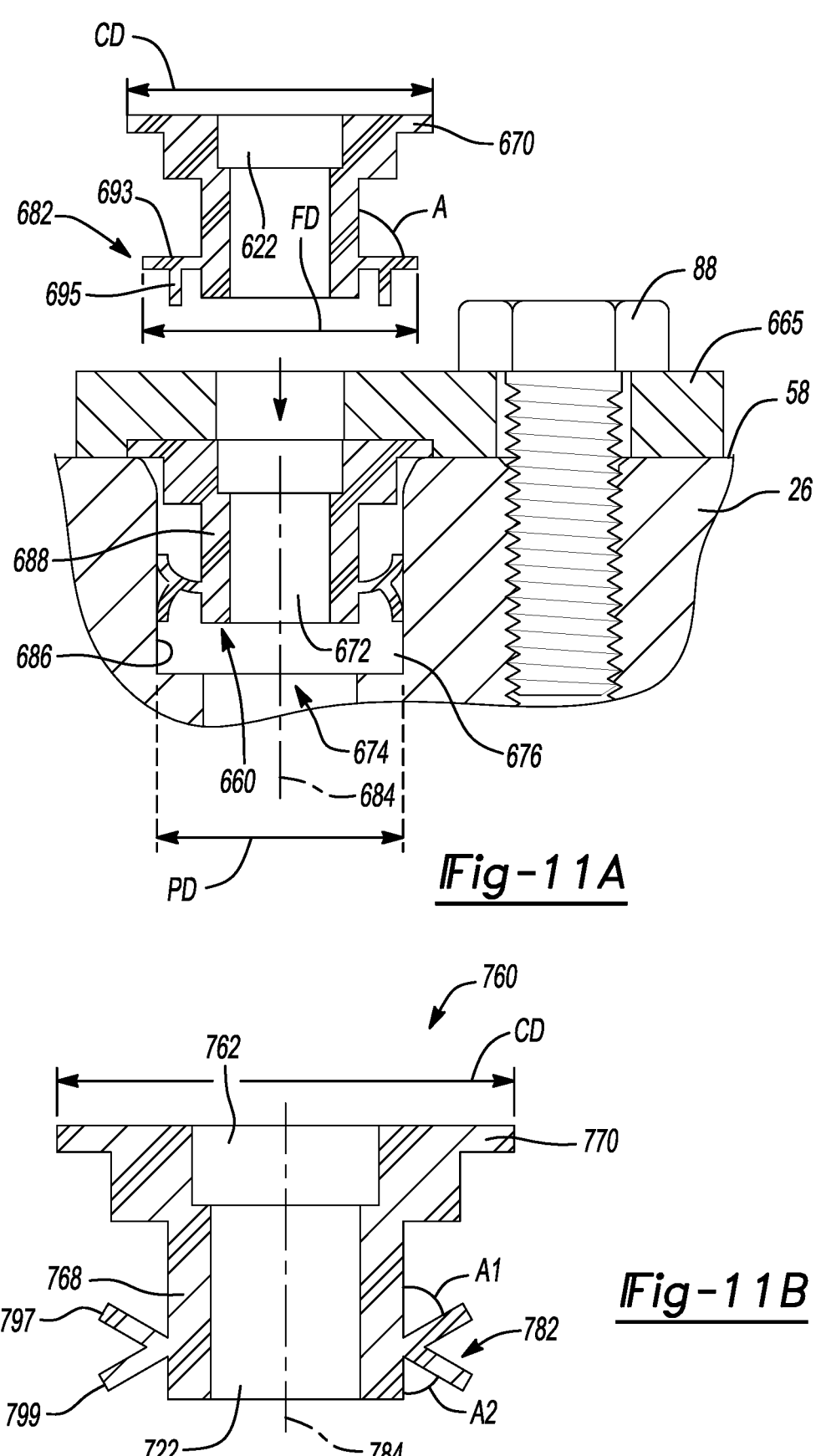
FIG. 11A is an enlarged cross-sectional view of the lower housing of the exemplary shock absorber assembly shown in FIG. 1 and illustrates another exemplary hydraulic port protection plug that is shown being installed in an exemplary hydraulic port in the lower housing.
FIG. 11B is an enlarged cross-sectional view of another exemplary hydraulic port protection plug for installation in a hydraulic port provided in the lower housing of the exemplary shock absorber assembly shown in FIG. 1.

FIGS. 11A-11B, illustrate two additional configurations of hydraulic port protection plugs 660, 760, where each hydraulic port protection plug 660, 760 has a self-closing pressure relief opening 662, 762 in the form of a linear slit. The hydraulic port protection plugs 660, 760 also have a cap portion 666, 766 and a tubular body 668, 768. The tubular body 668, 768 extends from the cap portion 666, 766 and has a geometric configuration that is configured to be insertable into a primary opening 676 in a hydraulic port 674 provided in the lower housing 26 of the shock absorber assembly 20. The primary opening 676 in the hydraulic port 674 has a primary opening diameter PD. The cap portion 666, 766 of the hydraulic port protection plugs 660, 760 includes an end wall 670, 770 and the tubular body 668, 768 extends from the end wall 670, 770 to define an open-ended cavity 672, 772 within the tubular body 668, 768 that is bounded at one end by the end wall 670, 770. The end wall 670, 770 of the cap portion 666, 766 extends radially outward from the tubular body 668, 768 to define a cap diameter CD that is larger than the primary opening diameter PD.

FIG. 11A illustrates a pressurizing tool assembly 665 that is secured in an abutting arrangement with the hydraulic port land 58 on the lower housing 26 by a bolt 88 that screws into the threaded bore 64 in the hydraulic port land 58. At least a portion of the cap portion 666, 766 of the hydraulic port protection plugs 660, 760 is made of an elastic material that permits the self-closing pressure relief opening 662, 762 to open when pressurized air or gas is supplied to the pressurizing tool assembly 665 or if pressure increases in the hydraulic ports 674 as a result of movement of the piston 42 and the piston rod 44 after the hydraulic port protection plugs 674, 674 are inserted into the hydraulic port 674.

FIGS. 11A and 11B differ in that they illustrate different deflectable flanges 682, 782 that are designed to seal against an inner surface 686 of the hydraulic port 674 in the lower housing 26 of the shock absorber assembly 20. The hydraulic port protection plug 660 illustrated in FIG. 11A has a deflectable flange 682 that includes a disc-shaped flange portion 693 that extends radially outward away from a centerline 684 of the hydraulic port protection plug 660 to a flange diameter FD that is larger than the primary opening diameter PD of the hydraulic port 674. The deflectable flange 682 of the hydraulic port protection plug 660 also includes an annular wall 695 that extends axially from the disc-shaped flange portion 693. As a result, the annular wall 695 is concentrically arranged in a radially spaced relationship with a portion of the tubular body 668 such that the deflectable flange 682 has a T-shaped cross-section before the hydraulic port protection plug 660 is installed in the hydraulic port 674. In other words, the disc-shaped flange portion 693 is arranged at a perpendicular angle A relative to the tubular body 668 before the hydraulic port protection plug 660 is installed in the hydraulic port 674. Because the flange diameter FD is larger than the primary opening diameter PD of the hydraulic port 674, the deflectable flange 682 deflects when the tubular body 668 is inserted into the hydraulic port 674, which gives the deflectable flange 682 a Y-shaped cross-section after the hydraulic port protection plug 660 is installed in the hydraulic port 674.

The hydraulic port protection plug 760 illustrated in FIG. 11B has a deflectable flange 782 that includes a pair of disc-shaped flange portions 797, 799 that extend radially outward, away from a centerline 784 of the hydraulic port protection plug 760. The disc-shaped flange portions 797, 799 are arranged at first and second oblique angles A1, A2 relative to the tubular body 768 such that the deflectable flange 782 has a V-shaped cross-section before the hydraulic port protection plug 760 is installed in the hydraulic port 674.

Figure 12:
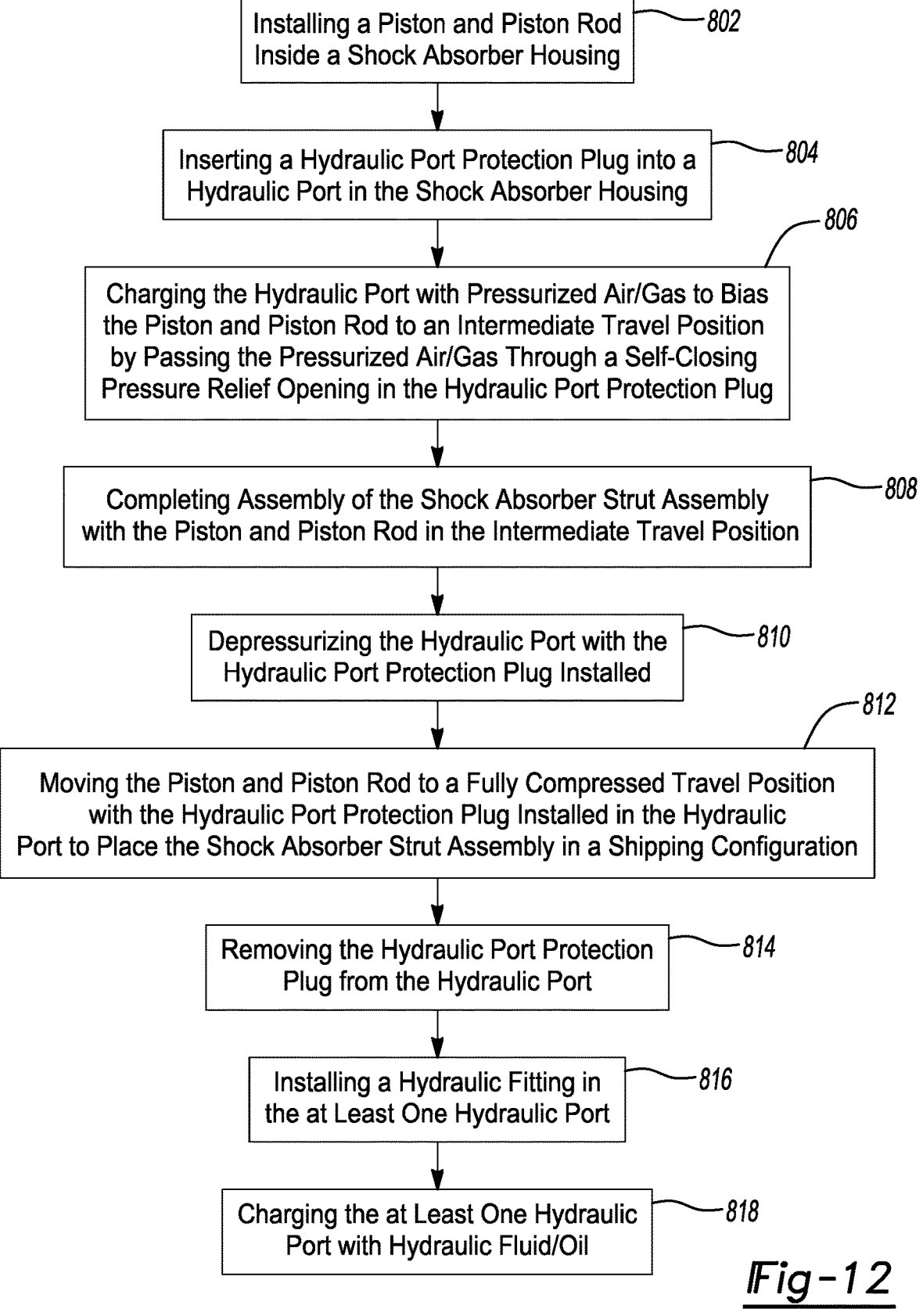
FIG. 12 is a flow diagram illustrating exemplary steps of a method for assembling the exemplary shock absorber assembly shown in FIG. 1.

A method of assembling the shock absorber assembly 20 described above is also provided. With reference to FIG. 12, the method comprises step 802 of installing a piston 42 and a piston rod 44 inside a shock absorber housing (e.g., the lower housing 26 of shock absorber 24) and step 804 of inserting one or more hydraulic port protection plugs 60 into one or more hydraulic ports 74 in the shock absorber housing 26. After step 804, the method continues with steps 806 of charging one or more hydraulic ports 74 with pressurized air or gas to bias the piston 42 and the piston rod 44 to an intermediate travel position (i.e., approximately half way between a fully compressed travel position and a fully extended travel position) by passing the pressurized air or gas through a self-closing pressure relief opening 62 in the hydraulic port protection plugs 60 after the hydraulic port protection plugs 60 are inserted into the hydraulic ports 74. By way of example and without limitation, this step may include attaching a pressurizing tool assembly 165 to a hydraulic port land 58 and supplying pressurized air at a pressure of approximately 3 bar. As explained above, it was not previously possible to perform step 806 after installing traditional shipping plugs because they would completely block off the hydraulic ports 74. After step 806, the method can proceed with step 808 of continuing and completing assembly of the shock absorber assembly 20 with the piston 42 and the piston rod 44 in the intermediate travel position. It should be appreciated that steps 802-806 may be carried out in a clean room to reduce the chance of contamination and that step 808 of continuing and completing assembly of the shock absorber assembly 20 may be performed outside a clean room because the hydraulic port protection plugs 60 operate to prevent contaminants from entering the hydraulic ports 74 of the shock absorber assembly 20. It should also be appreciated that the reason for pressurization step 806 is to prevent the piston rod 44 from moving inwards into the shock absorber housing 26 during the mounting of several modular components over the piston rod 44 such as the air bladder 40. The positive pressure of approximately 3 bar inside the first and second working chambers 50, 52 of the shock absorber 24 helps prevent the piston rod 44 from moving during assembly.

The method may further comprise steps 810 of depressurizing the hydraulic ports 74 with the hydraulic port protection plugs 60 installed in the hydraulic ports 74 and step 812 of moving the piston 42 and the piston rod 44 to the fully compressed travel position with the hydraulic port protection plugs 60 installed in the hydraulic ports 74 to place the shock absorber assembly 20 in a shipping configuration. Again, steps 810 and 812 were not previously possible with traditional shipping plugs, which could not permit air to escape from the hydraulic ports 74 for depressurization and were prone to blow out of the hydraulic ports 74 if installed when the piston rod 44 was moved to the fully compressed travel position. Previously, the shipping plugs would need to be removed during any pressurization or depressurization operations and also if the piston rod 44 needs to be moved. The requirement to remove the shipping plugs during these procedures presented points in the assembly process where contaminants could enter the hydraulic ports 74.

The method may also include step 814 of removing the hydraulic port protection plugs 60 from the hydraulic ports 74 in the shock absorber housing 26, step 816 of installing a hydraulic fitting in each of the hydraulic ports 74, and step 818 of charging the hydraulic ports 74 with hydraulic fluid or oil. Thus, it should be appreciated that the shock absorber assembly 20 described herein may be shipped to a customer "dry" and may not be filled with hydraulic fluid or oil until after the shock absorber assembly 20 is installed in a vehicle. Step 814 may further include extracting residual hydraulic fluid or oil from the hydraulic port(s) 74 by inserting an extraction tool through the self-closing pressure relief opening 62 in the hydraulic port protection plug(s) 60 prior to their removal from the hydraulic port(s) 74 so that any hydraulic fluid or oil that has collected in the hydraulic port(s) 74 behind the hydraulic port protection plug(s) 60 during shipping or storage does not run out when the hydraulic port protection plug(s) 60 are removed. It should further be appreciated that it is easier to remove the hydraulic port protection plugs 60 from the hydraulic ports 74 in step 814 because the self-closing pressure relief opening 62 in the hydraulic port protection plugs 60 prevent a vacuum from forming in the hydraulic ports 74 that can make removable of the hydraulic port protection plugs 60 more difficult.

Furthermore, step 804 of inserting the hydraulic port protection plugs 60 into the hydraulic ports 74 in the shock absorber housing 26 is performed independently of any particular positioning of the piston 42 and the piston rod 44 in the shock absorber housing 26. This is also different from what was previously possible with traditional shipping plugs. Previously, the piston rod 44 had to be fully compressed when the shipping plug was inserted into the compression side hydraulic port 74 (i.e., the hydraulic port 74 arranged in fluid communication with the second working chamber 52) and then the piston rod 44 had to be fully extended when the shipping plug was inserted into the rebound side hydraulic port 74 (i.e., the hydraulic port 74 arranged in fluid communication with the second working chamber 50) in order to prevent the shipping plugs from blowing out of the hydraulic ports. Once this was done, the piston rod 44 would naturally return to an intermediate travel position and the shock absorber assembly 20 would then be shipped in this condition.

Figures 13A, 13B:
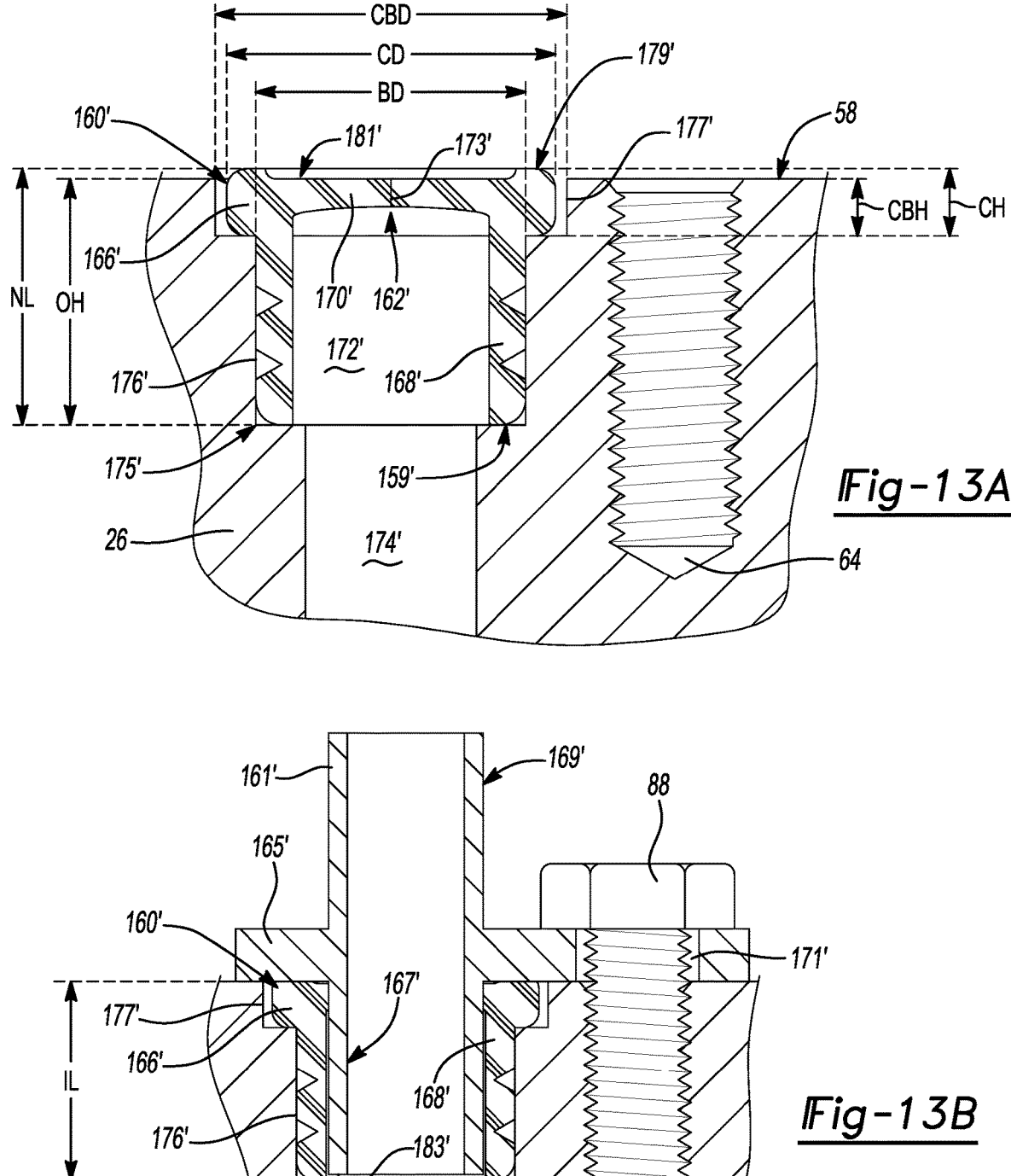
FIGS. 13A and 13B are enlarged cross-sectional views of the lower housing of the shock absorber assembly shown in FIG. 1 and illustrate another exemplary hydraulic port protection plug shown inserted in a hydraulic port in the lower housing with an exemplary fitting being pushed into the hydraulic port protection plug.

FIGS. 13A and 13B illustrate another exemplary hydraulic port protection plug 160' that is designed to be inserted in a hydraulic port 174' in the lower housing 26 of the shock absorber 24 and left in a hydraulic port 174' during and after the connection of a hydraulic coupling 161' to the hydraulic port 174'. In the illustrated example, the hydraulic coupling 161' is a hydraulic fitting with a flange 165' that divides the hydraulic fitting into an inboard portion 167' and an outboard portion 169'. Both the inboard and outboard portions 167', 169' are tubular in shape. The inboard portion 167' of the hydraulic fitting is designed to be inserted into the hydraulic port 174' by pressing/pushing the inboard portion 167' of the hydraulic fitting through the hydraulic port protection plug 160'. The outboard portion 169' of the hydraulic fitting is designed to be connected to a terminal end of a hydraulic line (not shown). The flange 165' is configured to mate/abut the hydraulic port land 58 on the lower housing 26 of the shock absorber 24 and includes a hole 171' that aligns with the threaded bore 64 in the hydraulic port land 58 such that a bolt 88 may be inserted through the hole 171' in the flange 165' and into the threaded bore 64 and tightened to secure the flange 165' against the hydraulic port land 58 in a tight abutting relationship. It should be appreciated that instead of using a separate hydraulic fitting, the hydraulic coupling 161' could be integrated into the terminal end of the hydraulic line, with or without the flange 165'.

The hydraulic port protection plug 160' includes a cap portion 166' and tubular body 168'. The tubular body 168' has a body diameter BD and extends longitudinally from the cap portion 166' to a plug end 159'. The cap portion 166' of the hydraulic port protection plug 160' extends radially outward from the tubular body 168' to define a cap diameter CD that is larger than the body diameter BD. The tubular body 168' has a geometric configuration that is configured to be insertable into the hydraulic port 174' in the lower housing 26 of the shock absorber 24. The hydraulic port protection plug 160' may be made of a deformable material, such as an elastic material, and has a natural length NL that extends longitudinally to include both the cap portion 166' and the tubular body 168'. By way of example and without limitation, the elastic material may be nitrile butadiene rubber (NBR) with a durometer of approximately 70 Shore. The natural length NL of the hydraulic port protection plug 160' equals the overall length of the hydraulic port protection plug 160' in an uncompressed, unconstrained condition.

Figures 14A, 14B, 14C, 14D:
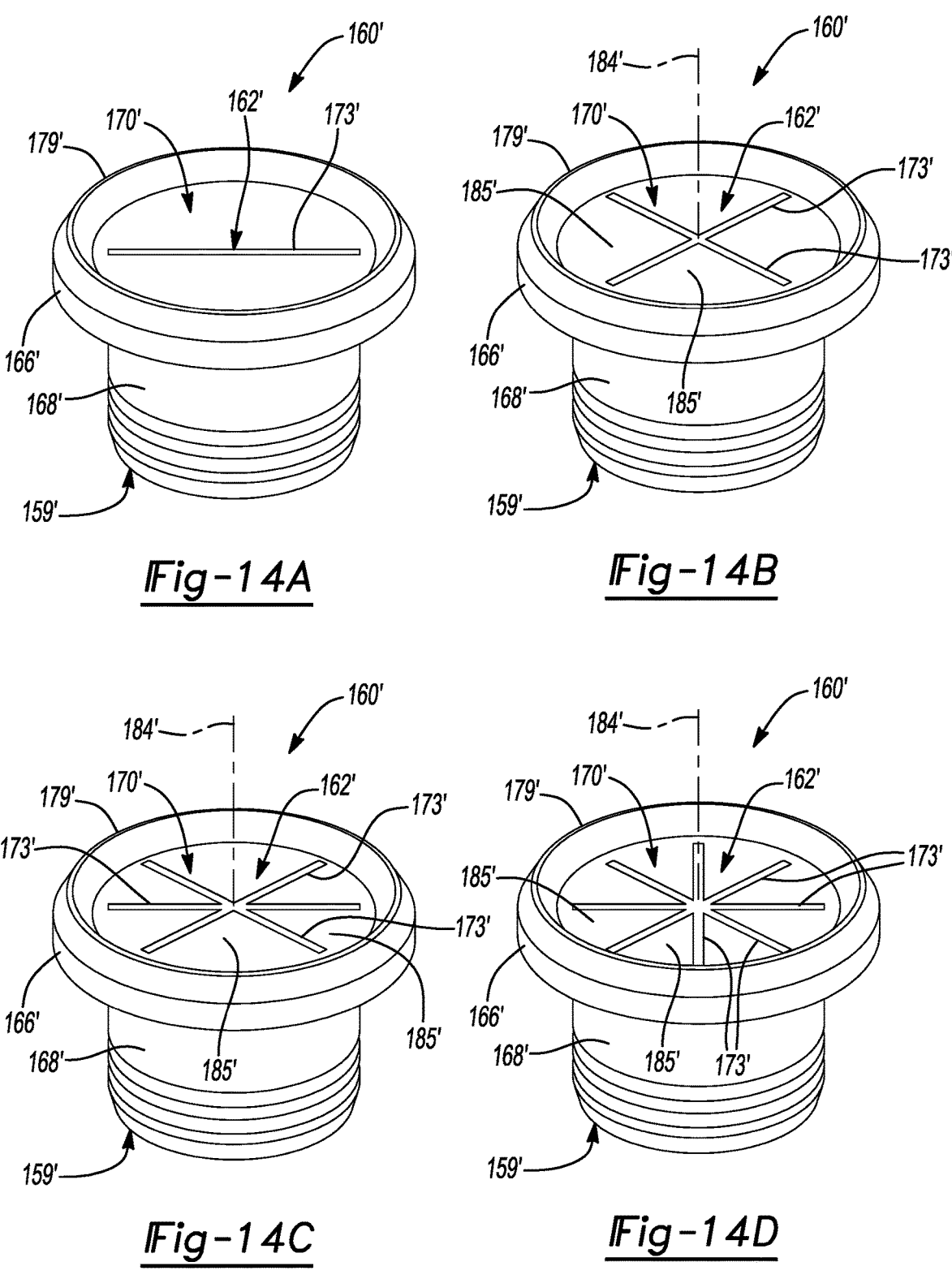
FIGS. 14A-14D are top perspective views of exemplary hydraulic port protection plugs of the configuration illustrated in FIGS. 13A and 13B.

The hydraulic port protection plug 160' includes a pierceable seal 162' that is configured to receive the inboard portion 167' of the hydraulic coupling 161' such that the hydraulic port protection plug 160' seals the hydraulic fitting 161' within the hydraulic port 174' in the lower housing 26 in an installed position, as shown in FIG. 13B. The pierceable seal 162' of the hydraulic port protection plug 160' is formed by a pierceable wall 170' and at least one linear slit 173' that extends through the pierceable wall 170'. As shown in FIGS. 14A-14D, the pierceable seal 162' may include any number of linear slits 173'. In embodiments where the pierceable seal 162' includes multiple linear slits 173' in the pierceable wall 170' (as shown in FIGS. 14B-14D), the multiple linear slits 173' crisscross and intersect at the centerline 184' of the hydraulic port protection plug 160' to delineate a number of wedge-shaped segments 185' in the pierceable wall 170'. In addition to providing a passageway allowing insertion of the inboard portion 167' of the hydraulic coupling 161', it should be appreciated that the linear slits 173' of the pierceable seal 162' may also provide all of the same functionality of the self-closing pressure relief opening 62 described above.

In the embodiment illustrated in FIGS. 13A-13B and 14A-14D, the pierceable wall 170' is co-planar with the cap portion 166' of the hydraulic port protection plug 160' and has a flat, planar, disc-like shape in a pre-installed condition of the hydraulic port protection plug 160'. The tubular body 168' extends from the cap portion 166' to define a cavity 172' with one open end and an opposite end that is bounded by the pierceable wall 170'. As shown in FIG. 13B, the inboard portion 167' of the hydraulic coupling 161' is received within the cavity 172' in the tubular body 168' when the inboard portion 167' of the hydraulic coupling 161' is pushed through the linear slit(s) 173' in the pierceable wall 170' during installation.

The hydraulic port 174' in the lower housing 26 of the shock absorber 24 includes a stepped-bore 175' with a first stepped portion 176' and a counterbore 177'. As shown in FIG. 13B, the first stepped portion 176' has a geometric configuration that is designed to receive the tubular body 168' of the hydraulic port protection plug 160' (and the inboard portion 167' of hydraulic coupling 161' when the inboard portion 167' of the hydraulic coupling 161' is inserted into the cavity 172' of the hydraulic port protection plug 160' in the installed position). The counterbore 177' is positioned longitudinally between the hydraulic port land 58 and the first stepped portion 176' and has a geometric configuration that is designed to receive the cap portion 166' of the hydraulic port protection plug 160'. In particular, the first stepped portion 176' has a diameter that equals the body diameter BD of the hydraulic port protection plug 160' such that the tubular body 168' of the hydraulic port protection plug 160' seals against the first stepped portion 176' of the hydraulic port 174'. As illustrated in FIGS. 13A and 13B, the hydraulic port protection plug 160' is also designed to compress longitudinally within the hydraulic port 174' when the flange 165' of the hydraulic coupling 161' is tightened against the hydraulic port land 58. This compression is the result of the relative geometries of the hydraulic port protection plug 160' and the hydraulic port 174'. In particular, the first stepped portion 176' and the counterbore 177' of the hydraulic port 174' has an overall height OH (i.e., overall depth) that is less than the natural length NL of the hydraulic port protection plug 160' such that the hydraulic port protection plug 160' compresses longitudinally within the hydraulic port 174' when the flange 165' of the hydraulic coupling 161' is tightened against the hydraulic port land 58.

The counterbore 177' has a counterbore diameter CBD and a counterbore height CBH (i.e., a counterbore depth). In the example illustrated in FIGS. 13A and 13B, the cap portion 166' of the hydraulic port protection plug 160' has a raised rim 179' that extends circumferentially about a bowl-shaped depression 181' in the cap portion 166' of the hydraulic port protection plug 160'. The raised rim 179' gives the cap portion 166' of the hydraulic port protection plug 160' a cap height CH in an uncompressed condition (as shown in FIG. 13A) that is larger than the counterbore height CBH such that the cap portion 166' experiences localized compression in the longitudinal direction when the flange 165' of the hydraulic coupling 161' is tightened against the hydraulic port land 58 (as shown in FIG. 13B). This compression of the cap portion 166' creates a fluid tight seal between the cap portion 166' of the hydraulic port protection plug 160' and the flange 165' of the hydraulic coupling 161'. The counterbore diameter CBD may be larger than the cap diameter CD to provide clearance for the cap portion 166' to flatten out and expand radially when the flange 165' of the hydraulic coupling 161' is tightened against the hydraulic port land 58. As such, the counterbore 177' is larger in diameter than the first stepped portion 176".

The inboard portion 167' of the hydraulic coupling 161' has an inboard length IL that extends longitudinally from the flange 165' to an inboard end 183' of the hydraulic coupling 161'. In the example illustrated in FIGS. 13A and 13B, the inboard length IL of inboard portion 167' of the hydraulic coupling 161' is less than the overall height OH (i.e., overall depth) of the first stepped portion 176' and the counterbore 177' of the hydraulic port 174' such that the plug end 159' sits inboard of the inboard end 183' of the hydraulic coupling 161' in the installed position (as shown in FIG. 13B).

Figures 15, 16:
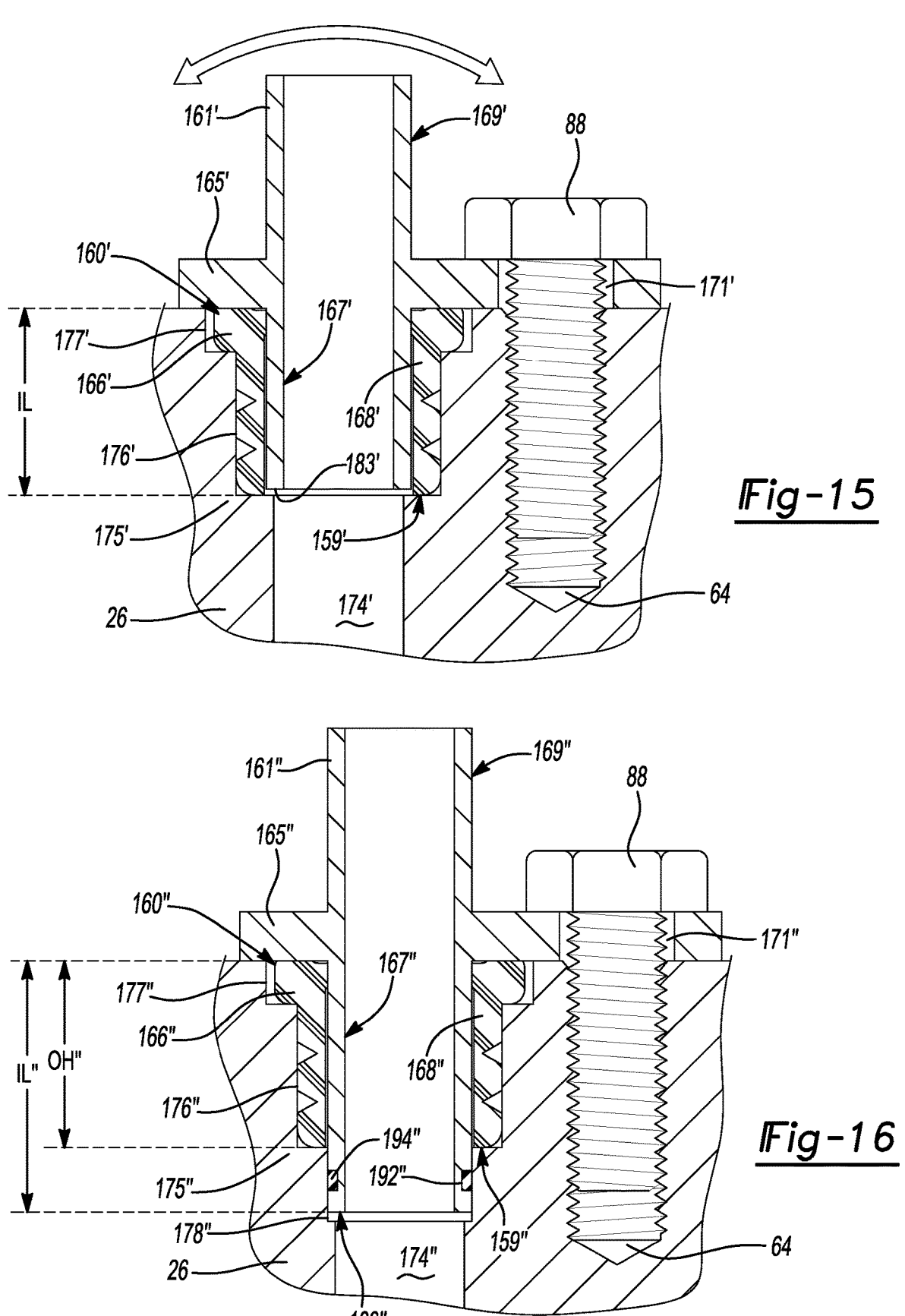
FIG. 15 is another enlarged cross-sectional view of the lower housing of the shock absorber assembly shown in FIGS. 13A and 13B and illustrates the resistance of the hydraulic fitting to rocking when in an installed position.
FIG. 16 is an enlarged cross-sectional view of the lower housing of the shock absorber assembly shown in FIG. 1 and illustrates another exemplary hydraulic fitting being inserted into the exemplary hydraulic port protection plug shown in FIGS. 13A and 13B.

As illustrated in FIG. 15, the abutment between the flange 165' of the hydraulic coupling 161' and the hydraulic port land 58 prevents the hydraulic coupling from excessive rocking in the installed position, but this requires the bolt 88 to be tight. Thus, an alternative embodiment is illustrated in FIG. 16 that shares all of the same features as the embodiment shown in FIGS. 13A-13B and 14A-14C, but where the inboard portion 167" of the hydraulic coupling 161" has been extended so that the inboard length IL" of the hydraulic coupling 161" is greater than the overall height OH" (i.e., overall depth) of the first stepped portion 176" and the counterbore 177" of the hydraulic port 174". Because many of the elements of the exemplary hydraulic port protection plug 160" and hydraulic coupling 161" shown in FIG. 16 are the same or substantially the same as those in the embodiments described above, they will not be described in detail again. Instead, equivalent elements shared between the embodiments have the same or corresponding reference numbers. For example, reference numeral 160" in FIG. 16 corresponds to reference numeral 160' in FIGS. 13A and 13B and so on and so forth.

To accommodate the longer inboard length IL" of the hydraulic coupling 161" in the embodiment shown in FIG. 16, the hydraulic port 174" includes a second stepped portion 178" with a geometric configuration that is designed to receive the inboard end 183" of the hydraulic coupling 161" in a close tolerance fit. This close tolerance fit between the second stepped portion 178" of the hydraulic port 174" and the inboard end 183" of the hydraulic coupling 161" gives the hydraulic coupling 161" greater stability and resistance to rocking, even when the bolt 88 is not completely tight. Thus, in this embodiment, the inboard end 183" of the hydraulic coupling 161" extends through and protrudes from the cavity 172" in the tubular body 168" of the hydraulic port protection plug 160" is positioned further inboard relative to the plug end 159". As such, the first stepped portion 176" is larger in diameter than the second stepped portion 178". Optionally, the inboard end 183" of the hydraulic coupling 161" may include a circumferential groove 192" that retains an O-ring seal 194" positioned within the circumferential groove 192". The O-ring seal 194" is configured to seal against the second stepped portion 178" of the hydraulic port 174" for improved sealing.

Figure 17:
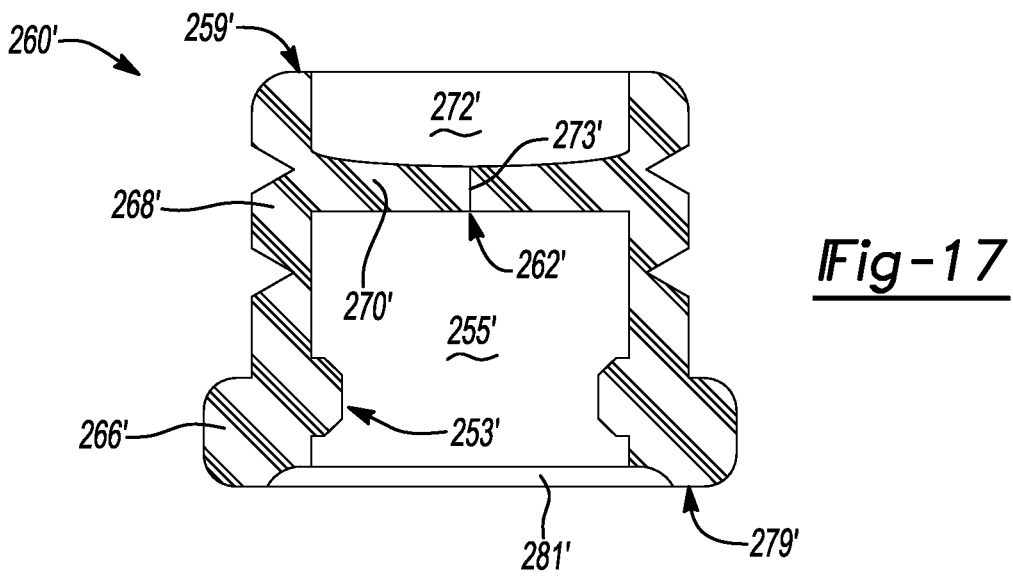
FIG. 17 is an enlarged cross-sectional view of another exemplary hydraulic port protection plug for installation in a hydraulic port provided in the lower housing of the exemplary shock absorber assembly shown in FIG. 1.
Figure 18A:
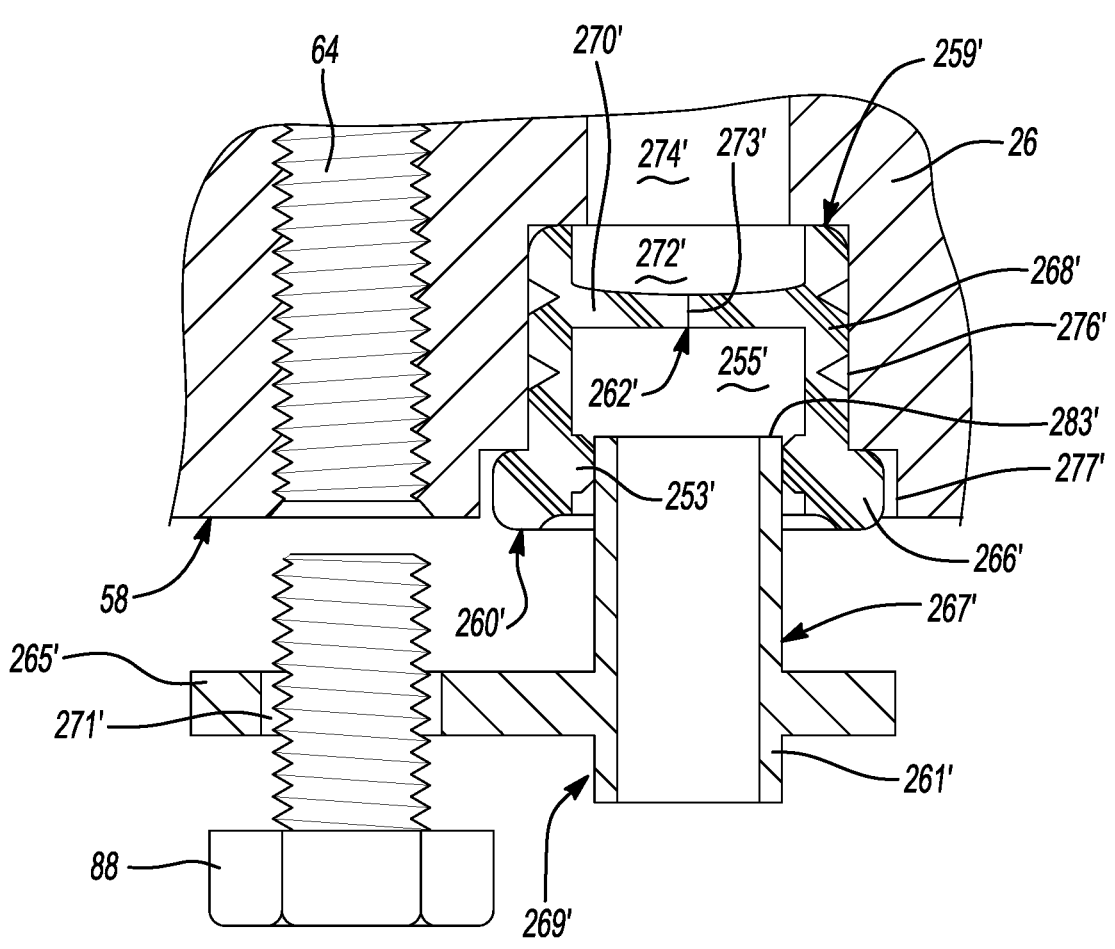

FIG. 17 and FIGS. 18A-18B illustrate another hydraulic port protection plug 260' that shares all of the same features as the embodiment shown in FIGS. 13A-13B, but the hydraulic port protection plug 260' in FIG. 17 and FIGS. 18A-18B has a pierceable wall 270' that is longitudinally spaced from the cap portion 266'. Because many of the elements of the exemplary hydraulic port protection plug 260' and hydraulic coupling 261' shown in FIG. 17 and FIGS. 18A-18B are the same or substantially the same as those in the embodiments described above, they will not be described in detail again. Instead, equivalent elements shared between the embodiments have the same or corresponding reference numbers. For example, reference numeral 260' in FIG. 17 and FIGS. 18A-18B corresponds to reference numeral 260' in FIGS. 13A and 13B and so on and so forth.

The hydraulic port protection plug 260' shown in FIG. 17 and FIGS. 18A-18B includes a cap portion 266' and tubular body 268'. The tubular body 268' extends longitudinally from the cap portion 266' to a plug end 259', while the cap portion 266' of the hydraulic port protection plug 260' extends radially outward from the tubular body 268'. The pierceable seal 262' is formed by a pierceable wall 270' that is longitudinally spaced from the cap portion 266' and is therefore intermediately positioned between the cap portion 266' and the plug end 259'. As a result, the pierceable wall 270' divides the tubular body 268' into a first cavity 255' that is positioned between the pierceable wall 270' and the cap portion 266' and a second cavity 272' that is positioned between the pierceable wall 270' and the plug end 259'. The first cavity 255' is open at the cap portion 266' and receives the inboard end 283' of the hydraulic coupling 261' before the inboard end 283' is advanced through the pierceable seal 262', which may be provided as one or more linear slits 273' in the pierceable wall 270' for example. The second cavity 272' is open at the plug end 259' and receives the inboard end 283' of the hydraulic coupling 261' after the inboard end 283' is advanced through the pierceable seal 262'.

Optionally, the hydraulic port protection plug 260' may include a sealing rib 253' that extends circumferentially along an inside surface of the tubular body 268' such that the sealing rib 253' protrudes radially inward into the first cavity 255' and contacts the inboard portion 267' of the hydraulic coupling 261' for additional sealing. The sealing rib 253' may be longitudinally spaced from the pierceable wall 270' and may be aligned with or adjacent to the cap portion 266' of the hydraulic port protection plug 260'.

FIGS. 19A and 19B illustrate another exemplary hydraulic port protection plug 360' that shares all of the same features as the embodiment shown in FIGS. 13A-13B, but the hydraulic port protection plug 360' in FIGS. 19A and 19B has a pierceable wall 370' with a funnel shape and a fitting piercing zone 387' that is at or near the centerline 384' of the hydraulic port protection plug 360'. Because many of the elements of the exemplary hydraulic port protection plug 360' shown in FIGS. 19A and 19B are the same or substantially the same as those in the embodiments described above, they will not be described in detail again. Instead, equivalent elements shared between the embodiments have the same or corresponding reference numbers. For example, reference numeral 360' in FIGS. 19A and 19B corresponds to reference numeral 160' in FIGS. 13A and 13B and so on and so forth.

As shown in FIGS. 19A and 19B, the funnel shape of the pierceable wall 370' is designed such that residual oil or hydraulic fluid HF in the hydraulic port 374' tends to collect within the cavity 372' of the hydraulic port protection plug 360' in the annular valley where the funnel shaped pierceable wall 370' meets the tubular body 368'. The fitting piercing zone 387' at or near the centerline 384' of the hydraulic port protection plug 360' is made of a frangible material such as nitrile butadiene rubber (NBR) or hydrogenated nitrile butadiene rubber (HNBR), for example, and forms the pierceable seal 362'. Thus, it should be appreciated that this geometry/arrangement reduces or prevents the residual oil or hydraulic fluid HF from leaking out of the cavity 372' when the inboard end 383' of the hydraulic coupling/fitting 361' is pushed through the fitting piercing zone 387'.

Alternatively, the pierceable seal 362' shown in FIGS. 19A and 19B may be replaced by the one-way joker valves 396, 496 shown in FIGS. 9A and 9B. In such an arrangement, the inboard end 383' of the hydraulic coupling/fitting 361' is pushed through the elastic valve throat 398, 498 of the one-way joker valves 396, 496, which extends into the cavity 372, 472 defined by the tubular body 368, 468 of the hydraulic port protection plugs 360, 460 shown in FIGS. 9A and 9B.

Figures 20A, 20B, 20C, 21A, 21B, 21C:
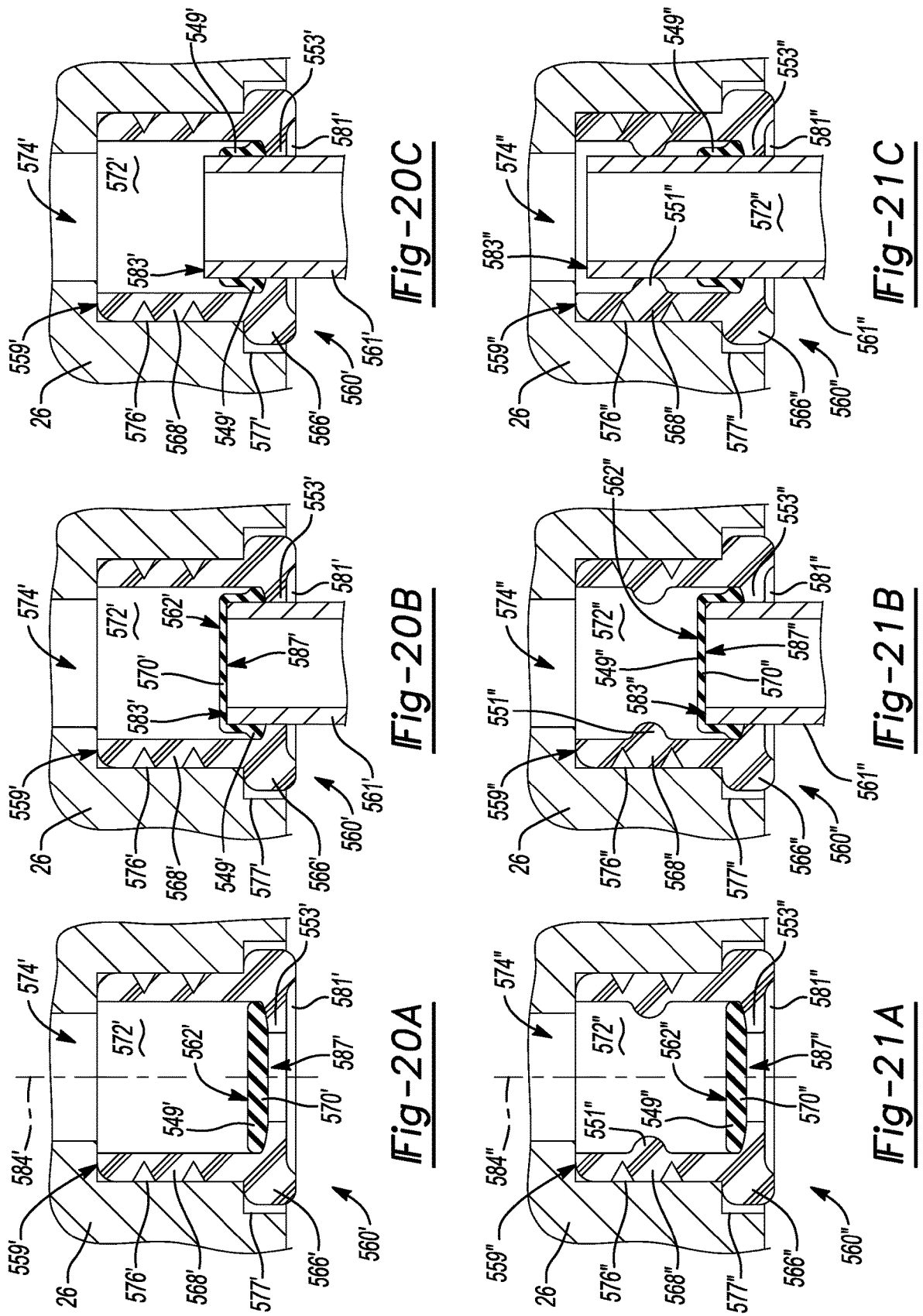
FIGS. 20A-20C are enlarged cross-sectional views of the lower housing of the shock absorber assembly shown in FIG. 1 and illustrate another exemplary hydraulic port protection plug shown inserted in a hydraulic port in the lower housing with another exemplary fitting being pushed through a frangible membrane in the hydraulic port protection plug.
FIGS. 21A-21C are enlarged cross-sectional views of the lower housing of the shock absorber assembly shown in FIG. 1 and illustrate another exemplary hydraulic port protection plug shown inserted in a hydraulic port in the lower housing with another exemplary fitting being pushed through a frangible membrane and past a sealing rib in the hydraulic port protection plug.

FIGS. 20A-20C illustrate another hydraulic port protection plug 560' that shares all of the same features as the embodiment shown in FIGS. 13A-13B, but the hydraulic port protection plug 560' in FIGS. 20A-20C has a pierceable wall 570' that includes a frangible membrane 549' that the hydraulic coupling 561' is pushed through. Because many of the elements of the exemplary hydraulic port protection plug 560' and hydraulic coupling 561' shown in FIGS. 20A-20C are the same or substantially the same as those in the embodiments described above, they will not be described in detail again. Instead, equivalent elements shared between the embodiments have the same or corresponding reference numbers. For example, reference numeral 560' in FIGS. 20A-20C corresponds to reference numeral 160' in FIGS. 13A and 13B and so on and so forth.

As shown in FIGS. 20A-20C, a portion of the pierceable wall 570' forming the pierceable seal 562' is made of a frangible membrane 549' to define a fitting piercing 587' at or near the centerline 584' of the hydraulic port protection plug 560'. By way of example and without limitation, the frangible membrane 549' may be made of a nitrile butadiene rubber (NBR) or hydrogenated nitrile butadiene rubber (HNBR). It should be appreciated that a portion of the pierceable wall 570' may be made of a frangible material such as NBR or HNBR, the entire pierceable wall 570' may be made of a frangible material such as NBR or HNBR, or the entire hydraulic port protection plug 560' may be made of a frangible material such as NBR or HNBR. In other words, the hydraulic port protection plug 560' may have a one-piece configuration and may be made of a single material that forms the cap portion 566', the tubular body 568', and the frangible membrane 549', the hydraulic port protection plug 560' may have a one-piece configuration and may be made of different materials/compounds where the material forming the frangible membrane 549' is different from the material/compound that forms the cap portion 566' and the tubular body 568', or alternatively the hydraulic port protection plug 560' may have a multi-piece configuration and may be made of different pieces/materials/compounds where the material forming the frangible membrane 549' is different from the material/compound that forms the cap portion 566' and the tubular body 568'.

The hydraulic port protection plug 560' illustrated in FIGS. 20A-20C also includes a first sealing rib 553', which is positioned immediately adjacent to the pierceable wall 570'. Thus, both the pierceable wall 570' and the first sealing rib 553' are generally aligned with and positioned radially inward of the cap portion 566'. As shown in FIGS. 20B and 20C, the inboard end 583' of the hydraulic coupling/fitting 561' is pushed through the fitting piercing zone 587' of the pierceable wall 570' until the frangible membrane 549' ruptures (FIG. 20C). When this occurs, the ruptured frangible membrane 549' seals against the inboard portion 567' of the hydraulic coupling/fitting 561'. The first sealing rib 553' extends circumferentially along an inside surface of the tubular body 568' such that the first sealing rib 553' extends radially inward and contacts the inboard portion 567' of the hydraulic coupling fitting 561' for additional sealing.

FIGS. 21A-21C illustrate another hydraulic port protection plug 560" that shares all of the same features as the embodiment shown in FIGS. 20A-20C, but the hydraulic port protection plug 560" in FIGS. 21A-21C additionally includes a second sealing rib 551" that is longitudinally spaced from the first sealing rib 553" and the pierceable wall

570". The second sealing rib 551" extends circumferentially along an inside surface of the tubular body 568" such that the second sealing rib 551" protrudes radially inward into cavity 572" and contacts the inboard portion 567" of the hydraulic coupling 561" for additional sealing. Because the elements of the exemplary hydraulic port protection plug 560" and hydraulic coupling 561" shown in FIGS. 21A-21C are the same as those in the embodiment shown in FIGS. 20A-20C and described above, they will not be described in detail again. Instead, equivalent elements shared between the embodiments have the same or corresponding reference numbers. For example, reference numeral 560" in FIGS. 21A-21C corresponds to reference numeral 560' in FIGS. 20A-20C and so on and so forth.

FIG. 22 illustrates a method of assembling the shock absorber assemblies 20 shown in FIGS. 13A-21C. With reference to FIG. 22, the method comprises step 802' of installing a piston 42 and a piston rod 44 inside a shock absorber housing (e.g., the lower housing 26 of shock absorber 24) and step 804' of inserting one of the hydraulic port protection plugs 160', 160", 260', 360', 560', 560" into one of the hydraulic ports 174', 174", 274', 374', 574', 574" in the shock absorber housing 26 to place the shock absorber assembly 20 in a shipping and handling configuration. The method then proceeds to step 805' of installing the shock absorber assembly 20 in a vehicle and step 816' of installing a hydraulic fitting 161", 261', 361', 561', 561" in the hydraulic port 174', 174", 274', 374', 574', 574" while the hydraulic port protection plug 160", 260', 360', 560', 560" is positioned in the hydraulic port 174', 174", 274', 374', 574', 574" by pressing at least a portion of the hydraulic fitting 161", 261', 361', 561', 561" through a pierceable seal 162", 262', 362', 562', 562" in the hydraulic port protection plug 160", 260', 360', 560', 560". It should be appreciated that step 805' and 816' may also be performed in the opposite order, where the hydraulic fitting 161", 261', 361', 561', 561" is installed first in accordance with step 816' followed by the shock absorber assembly 20 being installed in the vehicle according to step 805'.

The method further comprises step 817' of connecting the hydraulic fitting 161", 261', 361', 561', 561" to a hydraulic line to fluidly connect the hydraulic port 174', 174", 274', 374', 574', 574" of the shock absorber assembly 20 to another shock absorber in the vehicle suspension system and step 818' of charging the shock absorber assembly 20 by supplying hydraulic fluid or hydraulic oil to the hydraulic port 174', 174", 274', 374', 574', 574" via the hydraulic line.

Many other modifications and variations of the present disclosure are possible in light of the above teachings and may be practiced otherwise than as specifically described while within the scope of the appended claims.

What is claimed is:

1. A shock absorber assembly, comprising:

a shock absorber with a sliding piston that divides the shock absorber into first and second working chambers, a piston rod mounted to the sliding piston, and a lower housing opposite the piston rod;

at least one hydraulic port provided in the lower housing of the shock absorber; and a hydraulic port protection plug having a tubular body with a geometric configuration that is configured to be insertable into the at least one hydraulic port in the lower housing, wherein the hydraulic port protection plug includes a pierceable seal that is configured to receive a portion of a hydraulic fitting that is insertable through the pierceable seal of the hydraulic port protection plug and into the at least one hydraulic port in the lower housing such that the hydraulic port protection plug seals the hydraulic fitting within the at least one hydraulic port in the lower housing in an installed position.

2. The shock absorber assembly of claim 1, wherein the tubular body of the hydraulic port protection plug defines a cavity within the hydraulic port protection plug with one open end and an opposite end that is bounded by a pierceable wall.

3. The shock absorber assembly of claim 2, wherein the pierceable seal is a linear slit that extends through the pierceable wall and is arranged in fluid communication with the open-end cavity defined by the tubular body of the hydraulic port protection plug.

4. The shock absorber assembly of claim 2, wherein the pierceable seal is a plurality of linear slits that extend through the pierceable wall in a crisscross arrangement.

5. The shock absorber assembly of claim 2, wherein the pierceable seal is a one-way joker valve with an elastic valve throat that extends into the open-end cavity defined by the tubular body of the hydraulic port protection plug.

6. The shock absorber assembly of claim 2, wherein at least a portion of the pierceable wall is made of a frangible membrane to define a fitting piercing zone at or near a centerline of the hydraulic port protection plug.

7. The shock absorber assembly of claim 2, wherein the pierceable wall has a flat, planar shape in a pre-installed condition of the hydraulic port protection plug.

8. The shock absorber assembly of claim 2, wherein the pierceable wall has a funnel shape with a fitting piercing zone at or near a centerline of the hydraulic port protection plug.

9. The shock absorber assembly of claim 2, wherein the hydraulic port protection plug includes at least one sealing rib that extends circumferentially along an inside surface of the tubular body.

10. The shock absorber assembly of claim 9, wherein the at least one sealing rib is longitudinally spaced from the pierceable wall.

11. The shock absorber assembly of claim 9, wherein the hydraulic port protection plug includes a cap portion that extends radially outward from the tubular body.

12. The shock absorber assembly of claim 11, wherein the pierceable wall is co-planar with the cap portion.

13. The shock absorber assembly of claim 11, wherein the pierceable wall is longitudinally spaced from the cap portion.

14. A shock absorber assembly, comprising:
a shock absorber with a sliding piston that divides the shock absorber into first and second working chambers, a piston rod mounted to the sliding piston, and a lower housing opposite the piston rod;
a hydraulic port provided in the lower housing of the shock absorber;

a hydraulic coupling that is configured to mate with the hydraulic port in the lower housing of the shock absorber; and
a hydraulic port protection plug having a tubular body with a geometric configuration that is configured to be insertable into the hydraulic port in the lower housing of the shock absorber,
wherein the hydraulic port protection plug includes a pierceable seal that is configured to receive an inboard portion of the hydraulic coupling such that the hydraulic port protection plug seals the hydraulic fitting within the at least one hydraulic port in the lower housing in an installed position.

15. The shock absorber assembly of claim 14, wherein the hydraulic port in the lower housing includes a stepped-bore with a first stepped portion that receives both the hydraulic port protection plug and the inboard portion of hydraulic coupling in the installed position.

16. The shock absorber assembly of claim 15, wherein the stepped-bore of the hydraulic port in the lower housing includes a second stepped portion that receives an inboard end of hydraulic coupling in the installed position and does receive the hydraulic port protection plug.

17. The shock absorber assembly of claim 16, wherein the inboard end of the hydraulic coupling includes an O-ring seal that abuts the second stepped portion in the installed position.

18. The shock absorber assembly of claim 14, wherein the hydraulic coupling is a hydraulic fitting that is connected to a terminal end of a hydraulic line or is integral with the terminal end of the hydraulic line.

19. A method of assembling a shock absorber assembly of a vehicle suspension system, the method comprising the steps of:
installing a piston and a piston rod inside a shock absorber housing;
inserting a hydraulic port protection plug into a hydraulic port in the shock absorber housing to place the shock absorber assembly in a shipping and handling configuration;
installing the shock absorber assembly in a vehicle; and
installing a hydraulic fitting in the hydraulic port while the hydraulic port protection plug is positioned in the hydraulic port by pressing at least a portion of the hydraulic fitting through a pierceable seal in the hydraulic port protection plug.

20. The method according to claim 19, further comprising the steps of:
connecting the hydraulic fitting to a hydraulic line to fluidly connect the hydraulic port of the shock absorber assembly to another shock absorber in the vehicle suspension system; and
charging the shock absorber assembly by supplying hydraulic fluid or hydraulic oil to the hydraulic port via the hydraulic line.

* * * * *